(12) United States Patent
Saunders et al.

(10) Patent No.: US 11,306,932 B2
(45) Date of Patent: Apr. 19, 2022

(54) FRESH AIR BUILDING AND HOME VENTILATION APPARATUS AND METHODOLOGIES

(71) Applicant: Ventamatic, Ltd., Mineral Wells, TX (US)

(72) Inventors: John S. Saunders, Coppell, TX (US); Thomas L. Murrell, Weatherford, TX (US); Aaron E. Gary, Richardson, TX (US); Randall W. Clark, Euless, TX (US); James V. Kokal, Plano, TX (US)

(73) Assignee: Ventamatic, Ltd., Mineral Wells, TX (US)

( * ) Notice: Subject to any disclaimer, the term of this patent is extended or adjusted under 35 U.S.C. 154(b) by 789 days.

(21) Appl. No.: 16/071,066

(22) PCT Filed: Jan. 18, 2017

(86) PCT No.: PCT/US2017/013948
§ 371 (c)(1),
(2) Date: Jul. 18, 2018

(87) PCT Pub. No.: WO2017/127431
PCT Pub. Date: Jul. 27, 2017

(65) Prior Publication Data
US 2021/0172632 A1    Jun. 10, 2021

Related U.S. Application Data

(60) Provisional application No. 62/280,036, filed on Jan. 18, 2016.

(51) Int. Cl.
*F24F 11/30* (2018.01)
*F24F 11/74* (2018.01)
(Continued)

(52) U.S. Cl.
CPC .......... *F24F 11/30* (2018.01); *F24F 11/0001* (2013.01); *F24F 11/64* (2018.01);
(Continued)

(58) Field of Classification Search
CPC .......... F24F 3/02; F24F 3/044; F24F 11/0012; F24F 11/0017; F24F 11/0076;
(Continued)

(56) References Cited

U.S. PATENT DOCUMENTS 5,114,070 A * 5/1992 Lilja ..................... F24F 11/76
236/49.3
5,555,195 A * 9/1996 Jensen ..................... G01F 1/34
700/276
(Continued)

*Primary Examiner* — Kidest Bahta
(74) *Attorney, Agent, or Firm* — Whitaker Chalk Swindle & Schwartz PLLC; Charles D. Gunter, Jr.; Stephen S. Mosher

(57) ABSTRACT

A ventilation system with: (i) a volumetric enclosure having an inlet and an outlet and for coupling to an interior of a building habitable by human occupants; (ii) a fan located within the volumetric enclosure and for drawing air exterior to the building and supplying the air to the interior of the building; (iii) a programmable control apparatus for enabling and disabling the fan in response to a plurality of parameters, at least some of the parameters relating to quality of air to be moved in response to the fan; and (iv) circuitry coupled between the inlet and the outlet for measuring a signal representative of a volume of air passing through the volumetric enclosure over a period of time.

36 Claims, 17 Drawing Sheets

(51) Int. Cl.
*F24F 11/64* (2018.01)
*F24F 11/65* (2018.01)
*F24F 11/00* (2018.01)
*F24F 13/04* (2006.01)
*G05B 19/042* (2006.01)
*F24F 110/00* (2018.01)
*F24F 110/10* (2018.01)
*F24F 110/20* (2018.01)
*F24F 110/50* (2018.01)
*F24F 110/74* (2018.01)
*F24F 110/64* (2018.01)
*F24F 110/62* (2018.01)
*F24F 110/68* (2018.01)
*F24F 120/10* (2018.01)
*F24F 11/58* (2018.01)
*F24F 11/61* (2018.01)
*F24F 110/12* (2018.01)

(52) U.S. Cl.
CPC .............. *F24F 11/65* (2018.01); *F24F 11/74* (2018.01); *F24F 13/04* (2013.01); *G05B 19/042* (2013.01); *F24F 11/58* (2018.01); *F24F 11/61* (2018.01); *F24F 2011/0002* (2013.01); *F24F 2110/00* (2018.01); *F24F 2110/10* (2018.01); *F24F 2110/12* (2018.01); *F24F 2110/20* (2018.01); *F24F 2110/50* (2018.01); *F24F 2110/62* (2018.01); *F24F 2110/64* (2018.01); *F24F 2110/68* (2018.01); *F24F 2110/74* (2018.01); *F24F 2120/10* (2018.01); *G05B 2219/2614* (2013.01)

(58) Field of Classification Search
CPC .... F24F 11/0079; F24F 13/04; G05D 7/0647; G01F 15/0003
See application file for complete search history.

(56) References Cited

U.S. PATENT DOCUMENTS

| | | | | |
|---|---|---|---|---|
| 5,564,626 A * | 10/1996 | Kettler | ............ | F24F 8/10 236/49.3 |
| 6,079,627 A * | 6/2000 | Kettler | ............ | G01F 5/005 236/49.3 |
| 6,386,281 B1* | 5/2002 | Ganesh | ............ | F24F 3/1405 165/252 |
| 2003/0146289 A1* | 8/2003 | Sekhar | ............ | F24F 11/30 236/49.3 |
| 2006/0130663 A1* | 6/2006 | Joshi | ............ | A61L 9/015 96/224 |
| 2008/0073440 A1* | 3/2008 | Butler | ............ | F24F 11/30 236/91 R |
| 2008/0108295 A1* | 5/2008 | Fischer | ............ | F24F 3/1423 454/239 |
| 2013/0265064 A1* | 10/2013 | Hamann | ............ | G01N 17/04 324/700 |
| 2014/0244001 A1* | 8/2014 | Glickfield | ............ | H04L 67/16 700/33 |
| 2015/0167995 A1* | 6/2015 | Fadell | ............ | F24F 11/30 700/275 |

* cited by examiner

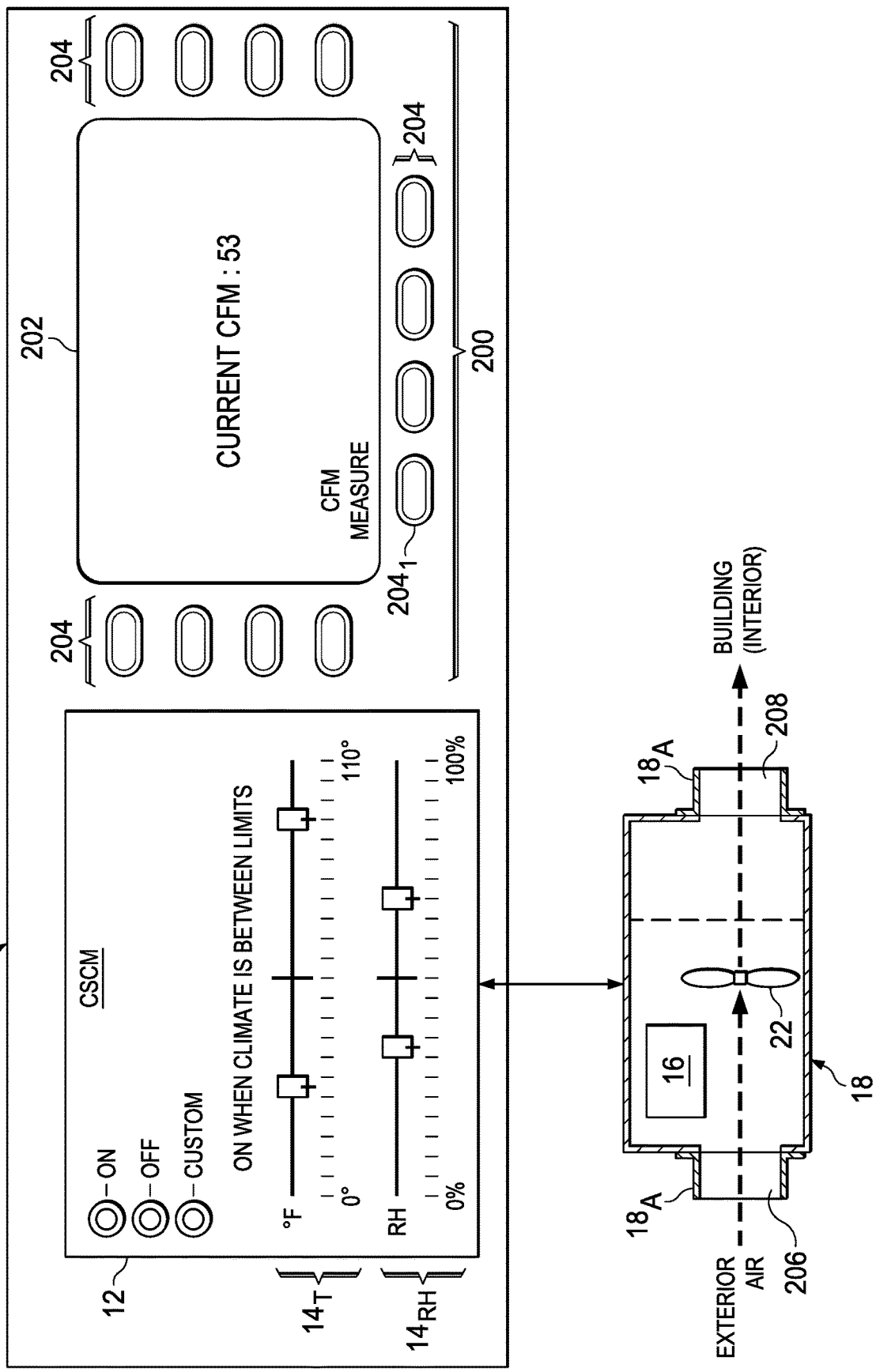

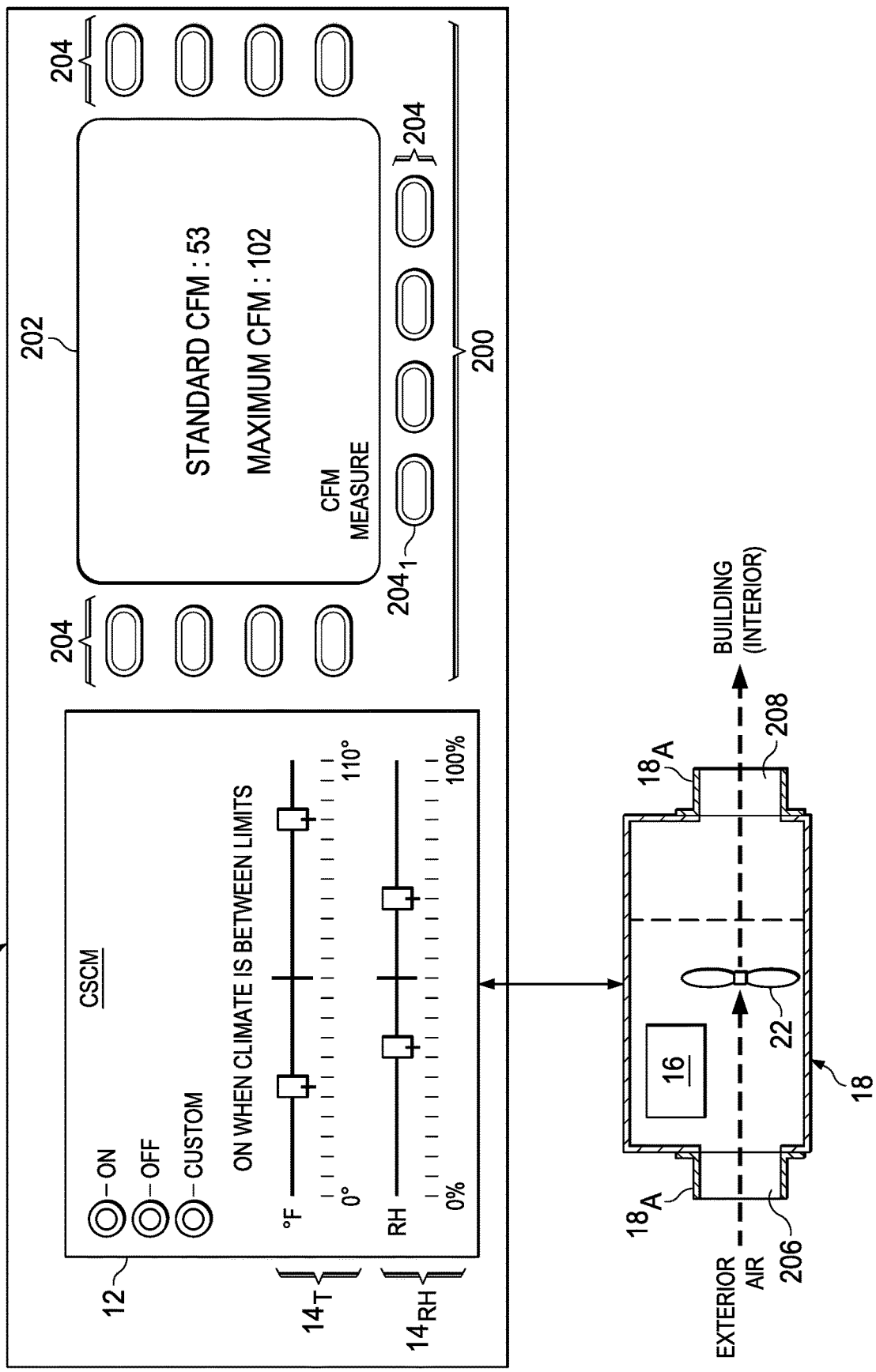

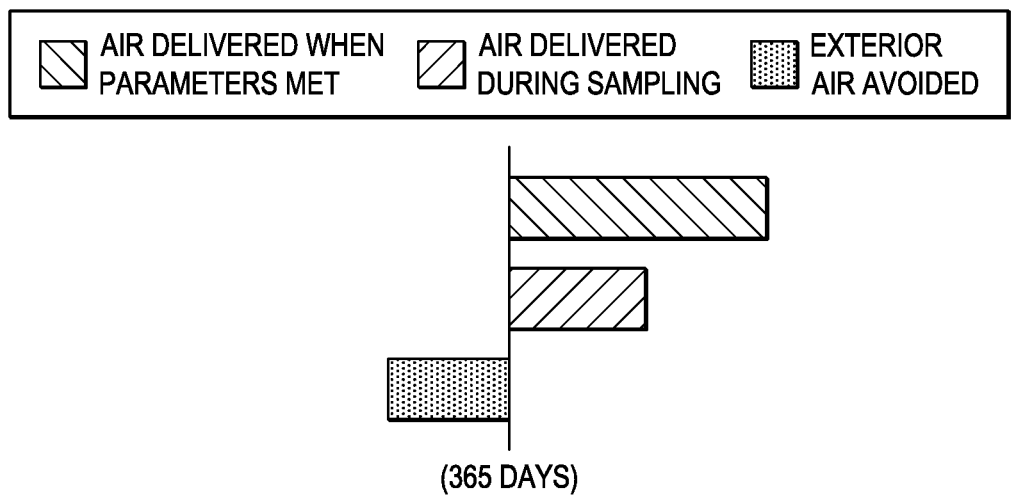
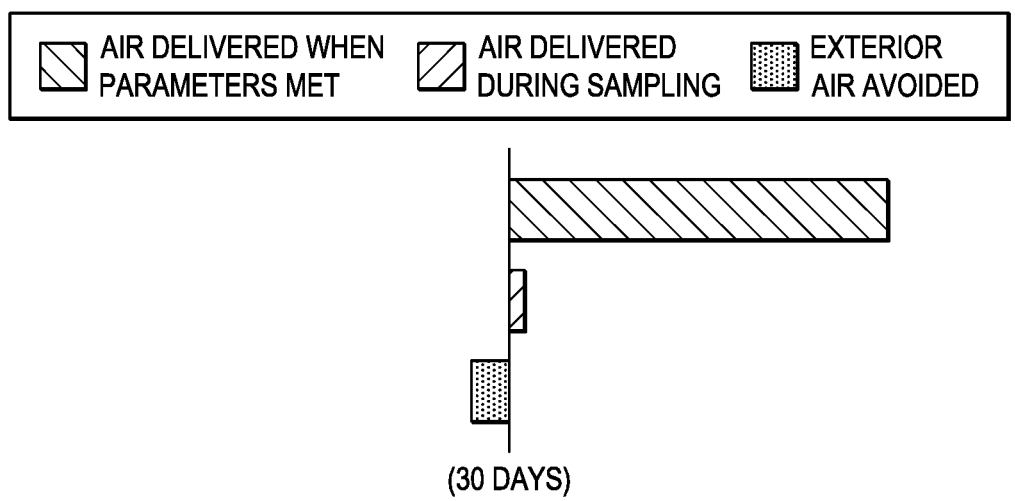

FIG. 11C
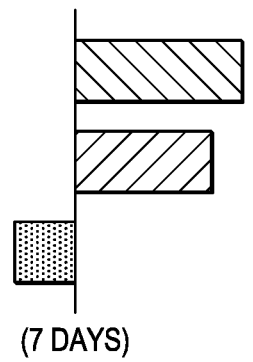
(7 DAYS)
FIG. 11D
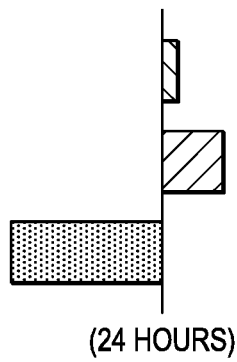
(24 HOURS)

FRESH AIR BUILDING AND HOME VENTILATION APPARATUS AND METHODOLOGIES

TECHNICAL FIELD

The preferred embodiments relate to ventilation systems for dwellings such as residential, multifamily, and small commercial buildings, and are more particularly to a system with a controlled, multi-parameter, multiple-speed mechanical ventilation.

BACKGROUND ART

One current goal of public policy with regard to air pollution and carbon emissions is to continue the push to make new and existing homes and other buildings more energy efficient. A key element in the push towards this increasing energy efficiency is to vastly reduce the infiltration of outdoor air into buildings and therefore to reduce the heating and cooling load associated with outdoor air that is too hot or cold and air that is too dry or too humid and must be conditioned to great energy cost. However, as homes are "tightened" in this manner to reduce infiltration, also introduced is the potential for the immediate and long-term buildup of indoor pollutants. These pollutants can come from the off gassing construction products or from the long term impacts of human occupation in these buildings. This buildup creates the likelihood of indoor air quality problems and creates a significant potential for increasing the latent negative health impacts of poor indoor air quality. Therefore, a result of increased push to more energy efficiency in buildings is a counterpart growth in the "requirements for" and the "performance measurements of" mechanical ventilation, that is, the need for an active system that introduces exterior air into the building so as to counteract the issues described above.

Smart compliance of ventilation will be extraordinarily important not just because of the health impacts, but also because of how the mechanical ventilation impacts overall energy efficiency performance. This includes efforts to reduce peak demand on the electric grid, the ability of the ventilation products to support compliance to the energy code, as well as the total amount of energy used to properly ventilate spaces. The 2012 IECC and 2015 IECC both mandate mechanical fresh air in all low-rise residential buildings. Future versions of ASHRAE 62.2, current versions of ASHRAE 62.1, and future versions of California Title 24 Energy Code promote the concept that all residential buildings (including high rise apartments) will be required to have mechanical ventilation. Energy efficiencies compliance to programs like ENERGY STAR and the DOE's Zero Energy Ready Home (ZERH) will lead above code programs in pushing for ASHRAE Standard 62.2-2013 which, in essence, significantly increases the amount of mandated mechanical fresh air. There are current studies by Harvard and United Technologies Corporation that demonstrate increased ventilation in commercial spaces improve worker productivity and are a worthy consideration along with the energy penalty.

The current construction marketplace has significant resistance to ventilation standards and ventilation requirements. Part of this resistance is an understandable resistance to change, that is, a reluctance to accept something different. A larger part of the resistance comes from the failure of current products on the market to effectively address the significant problems that exist in the delivery of mechanical ventilation. There are numerous problems that the current set mechanical ventilation products do not address, including those described below.

A first current mechanical ventilation drawback is occupant comfort. The art has attempted to address this issue, in some instances, using so-called Heat Recovery Ventilators and Energy Recovery Ventilators (HRV's and ERV's). These ventilation systems temper the extremes with air to air heat exchangers, but they are costly alternatives. They are not found in high volume installations in the southern half of the USA and even in the northern climate zones they are most often found on custom homes and very high end multifamily projects. The vast majority of ventilation projects simply bypass these very expensive systems and utilize one of other less costly systems. Yet, these low cost systems have major flaws and create comfort problems that add to transition difficulty. This problem is particularly difficult in extreme climates . . . hot, cold, or high humid or very dry climates or time periods. When products pump in the required amount of cubic feet per minute (CFM) of outdoor air, the conditions of the outdoor air sometimes overwhelm the properly designed HVAC load calculations of the installed system. Often, the quick and easy response or solution to extreme air from ventilation is to disconnect or turn off the ventilation system. Disconnecting their ventilation system creates a long term, very negative, very difficult situation because indoor air quality is a long-term health problem and comfort is a short term problem that tends to overwhelm the lack of understanding the long term benefits of mechanical ventilation. Turning the system off often has the same impact as disconnect, as once off, often the system is never turned back on again.

A second current mechanical ventilation drawback is noise. "Supply only" ventilation installations are the predominant methodology used in hot and hot and humid climates, where a very significant percentage of single family and multifamily construction is being performed. These "supply only" systems are tied to HVAC systems or furnace systems or air handlers (often known as Central Integrated Fan) and would normally not run often in the spring or fall. Yet, when tied to a ventilation controller working on an intermittent system, these Central Integrated Fans run 20 to 30 minutes every hour as that is how they are programmed to perform by the mechanical ventilation controller. This frequent run time can cause confusion for the occupant during mild shoulder seasons. Even when explained to a homeowner or tenant, they ask the question, "Why is my furnace running? We are not heating, not cooling". They tend to forget about the mechanical ventilation. And, just as often, they fail to understand (or were never properly told) the importance of ventilation to the long term health of the building. The residents may then try to turn the furnace or the air handler off, and typically they discover that the device will not turn off They often then get someone else to turn off the fresh air system controller because of noise and association of the furnace and air handler with noise. They remove a short term noise irritant, but the lack of understanding and association of this noise situation with the benefits of mechanical fresh air makes them lose long term indoor air quality and creates the potential for long term negative health impacts of no ventilation in tight homes. The cost issue again prevents the vast volume from selecting an ERV or HRV to resolve the noise issue. Exhaust only ventilation (using a quiet mechanical bath fan) would be one acceptable noise solution. But, in some codes (most notably California) mechanical trickle vents are required to complement exhaust-only strategies and those are often a complete deal breaker for all stakeholders. In hot/humid areas, exhaust only strategies create negative pressure which has the potential to pull hot/humid air through the building envelope. While recent research has reduced the "red alert" level of this potential for microbial growth on the interior walls of the structure, this has been so long and so furiously looked at with fear and concern that it is not considered a good alternative in humid climates.

A third current mechanical ventilation drawback is the associated energy penalty, which is a significant issue for both builders and occupants. Issues of energy penalty are both real and perceived by the builder, and by the occupant who pays the utility bill. One frequent builder/consumer comment is . . . "we spend a huge amount of money to seal the walls of the building tight, only to cut a hole and pump large amounts of outdoor air through it." There is frustration at the idea of bringing in very hot or very hot and humid or very cold and dry air into structures and then having to use energy sources to address the comfort impacts of the ventilated air. This is particularly true during peak time periods for utilities, most notably on hot summer afternoons when electricity load is peaking. Mechanical ventilation adds both the load from the ventilation machinery and also the extra cooling load from bringing in the hottest or most humid air at the time of the biggest demand and asking the AC system to overcome that extra sensible and latent load as well. In winter, the additional load comes from cold ventilated air that must be heated and may be so dry as to require humidification. Building Science research shows that about a third of all heating and cooling energy use comes from the system trying to overcome the impacts of ventilation.

A fourth current mechanical ventilation drawback consideration arises from installation, which relatedly involves potential complexity, improper installation, and commissioning or verification of the install. Standards and Oversight organizations are now spending considerable resources on improving the methodologies to confirm that ventilation systems are actually delivering to the required standards. There are concerns about faux ventilation systems and even with some form of commissioning performance report, compliance is difficult. There are many kinds of product problems that exist; beginning with installation problems. Many of these products are extraordinarily difficult to install or install correctly. Many of these options require complicated wiring that is often improperly completed. Many of these options require a series of miscellaneous pieces where it is easy for an installer paid by the job to not install a piece. The job looks correct on the outside but is missing the internal pieces to properly function according to the design. Many times, the installers do not have the appropriate background or have not received any training in the installation of the ventilation system they are required to install. Incorrectly installed ventilation products can exacerbate the very problems that they were designed to resolve. As a result, the cost of installing these products will continue to rise as the measurement of performance will be mandated and the tools of measurement and the time and requirements will continue to increase.

A fifth current mechanical ventilation drawback is maintenance complexity and failure to maintain ventilation products. There are significant maintenance requirements with all HVAC products and ventilation is not an exception. As problems occur after installation, there is no system or process to communicate to the occupant or the management company if the problems continue or if the problems have been resolved. Because of the lack of performance recording of the existing products and because there is simply no way to determine if, or ensure that, these existing products are performing at the same level as at commissioning and certainly, after commissioning they are almost never checked for performance again. Even if they do perform at one point in time once the ventilation product is turned off many times, perhaps the majority of the time, they never get turned back on again. Reporting of installation problems or maintenance problems and reporting back that they are repaired and operating properly is exceptionally important.

A sixth current mechanical ventilation drawback is installer resistance. There is trade contractor resistance for mechanical fresh air. Mechanical ventilation is, or is perceived as, expensive and time consuming to install. At present, ventilation is seen as an increase in unreimbursed cost: labor cost overruns, installation red tags, call backs, warranty complaints, and legal liability. Many HVAC installation companies believe they are not able to generate a return on the investment and because they do not believe they are making money on the effort, they resist all efforts at supporting mechanical ventilation. The process is simply too fraught with problems for it to be of value for the contractor.

A seventh current mechanical ventilation drawback is that outdoor air is not always cleaner. The general standard of ventilation measurement assumes that outdoor air is cleaner than indoor air. In the vast majority of cases, that is true. But, there are specific instances, where indoor air may be better. People impacted by particular "pollens" may wish to particularly avoid mechanical ventilation in their home at the time of the year when those pollen spores are in the air. The western states are subject to periodic "haboob" events (great dust storms) where it would be better for the inside of the building to have no outdoor air rather than to be bombarded by dust particles. There are other examples; high ozone days, high humidity days, etc. where the ability to moderate some or all of the outdoor air because the indoor air would be cleaner and healthier for the occupants. The current ASHRAE Standards allow for occupants to turn off ventilation for these events. All current products must have a way for occupants to turn their product off But, in actuality, off usually means off for a period of time much longer than the temporary existence of undesirable outdoor air, or even long term or permanently once the user switches the ventilation off There is no product that has an easy "turn the product on" method for the occupant and that is an important element towards long-term indoor air quality and the indoor health associated with it.

An eighth current mechanical ventilation drawback is the lack of "owner value" proposition. For home, apartment, and building occupants, there is lack of a clear value proposition. Who benefits? Why do they benefit? What is the value and virtue of this? Why am I having comfort complaints? Why am I increasing my utility bill? What is the value of this fresh air? I'm living in a new home; I've got the new home smell. And the negative potential of real compliance, humidity, water intrusion, aesthetics, energy penalty potential, and actual energy penalty perceived, and the lack of the clarity of what is expected creates a difficulty about why people change and why people want to change. And that is another one of the major difficulties of why ventilation is hard to get implemented in the marketplace. It is recognized in connection with providing the preferred embodiments that there is a clear need for a realistic measurement system for the building, so that the occupants can evaluate the quality and performance of their indoor air. An additional need exits to give a measurement of performance that tells the occupants where they are in terms of a standard of performance and why that is good or not or not good.

Then, the occupants can demand fresh air as an important value proposition and savvy sellers of residential and small commercial buildings will deliver ventilation systems in their structures that meet the emerging demand. Then the occupants can find a way to pick a fresh air that meets their particular needs. One family may have particular issues with pollen or a particular kind of pollen. Another may not have pollen issues but live in a high radon area and also be subject to significant ozone alerts. Urban multifamily dwellings located next to highways may want to have specific time periods (rush hour) where they do not ventilate or may want to sense auto emissions and not ventilate when those emissions are above a certain measurable level. These are important choices and can really give a future value to the ownership of mechanical ventilation.

In view of the preceding and still other factors, the performance from the high volume/lower cost products currently available deliver poor results and negative outcomes, sometimes producing false representations or understanding of the actual ventilation achieved. Contractors and builders are deterred from compliance and not always forthright about ventilation performance. Indeed, the ASHRAE 62.2 Standard recognizes that there are problems with ventilation products and significant differences in how occupants view comfort and deal with the energy penalty. To address this issue, the ASHRAE Standard requires that all ventilation systems have a way for the occupants to turn the ventilation system to "off". As a result, however, owners and occupants are shutting off systems, never to turn them back on again. The result is often a failure scenario.

Yet, fresh air is important due to the health impacts and regulatory compliance is a future, if not present, reality. Previous data indicates that outdoor air is two to five times cleaner than indoor air. As codes require more energy efficient and tighter buildings, newer research may well discover that outdoor air (most of the time) is much cleaner than two to five times the indoor air. There is a correlation between the quality of indoor air and the indoor air health. It is a slow and long gestation period. It takes a long time for the indoor air problems to show up. When it does, it typically first affects the young and elderly. The ventilation standards recognize that these issues exist. The standards offer no particular solutions but they do recognize the significant need for flexibility. And, there is great debate among the experts about the proper amount of fresh air that is required for proper indoor health.

As can be seen above, ventilation considerations when properly considered involve myriad factors and existing systems with attendant drawbacks. The preferred embodiments seek to improve upon the above drawbacks, as further explored below.

DISCLOSURE OF INVENTION

In one preferred embodiment, there is a ventilation system. The system comprises: (i) a volumetric enclosure having an inlet and an outlet and for coupling to an interior of a building habitable by human occupants; (ii) a fan located within the volumetric enclosure and for drawing air exterior to the building and supplying the air to the interior of the building; (iii) a programmable control apparatus for enabling and disabling the fan in response to a plurality of parameters, at least some of the parameters relating to quality of air to be moved in response to the fan; and (iv) circuitry coupled between the inlet and the outlet for measuring a signal representative of a volume of air passing through the volumetric enclosure over a period of time.

Other preferred embodiments and aspects are described and claimed.

BRIEF DESCRIPTION OF DRAWINGS

The preferred embodiments will be described in detail below by referring to the accompanying drawings:

FIG. 3A again illustrates some of the aspects shown in FIG. 1, with additional details with respect to capturing an air flow measure through duct 18.

FIG. 3B illustrates the view of FIG. 3A, wherein the display 202 depicts both a standard CFM measure and a maximum CFM measure.

FIGS. 11A through 11F illustrates various preferred embodiment examples of how accumulated data from controller 10 may be displayed either via display 202 or remotely in a graphical user display or interface.

DESCRIPTION OF EMBODIMENTS

Figure 1:
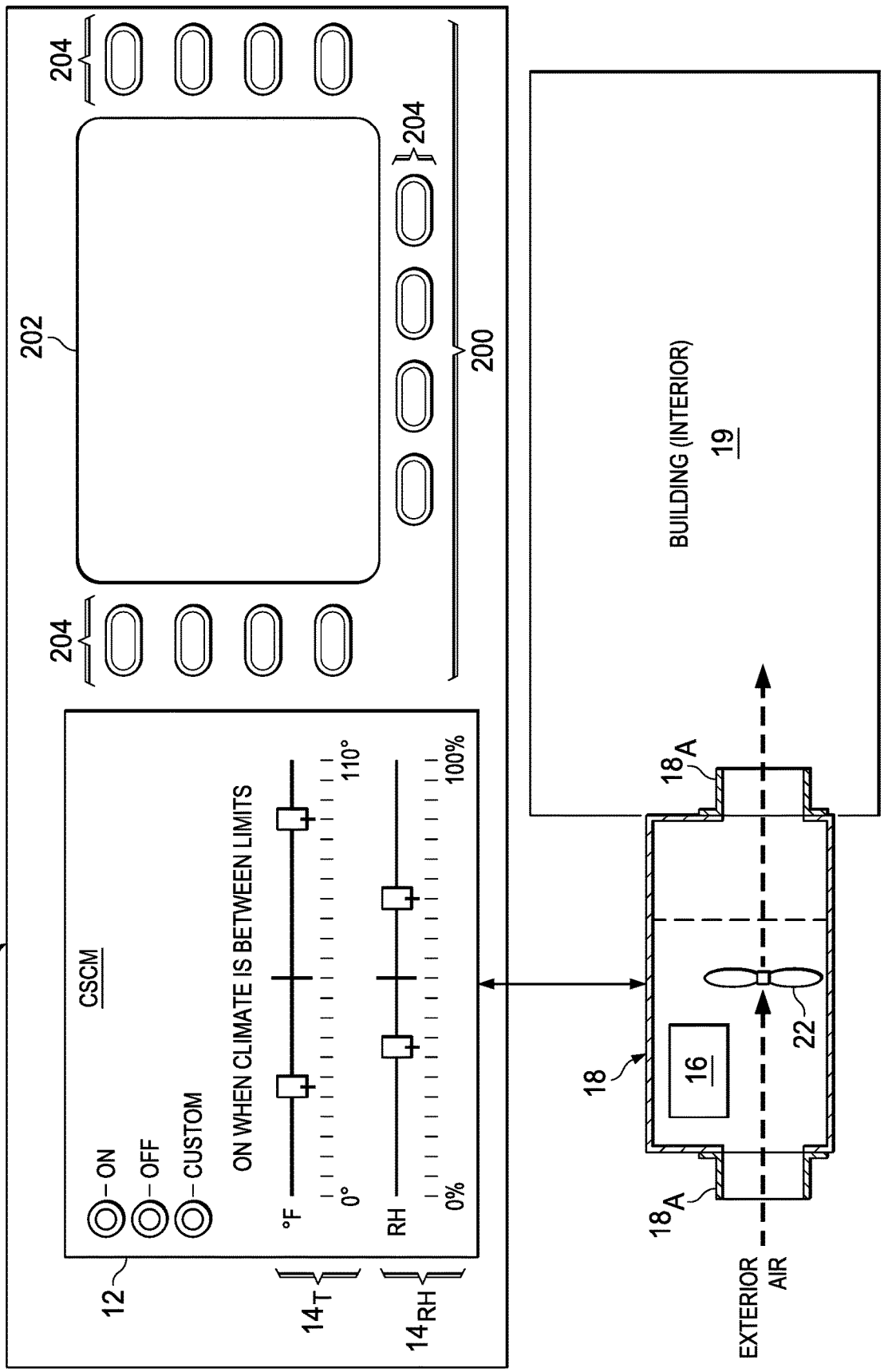
FIG. 1 illustrates an electrical block diagram of a controller 10 according to a preferred embodiment.

The preferred embodiments, in part, further improve previous work on ventilation in response to temperature and humidity by John Stephen Saunders, as described in U.S. patent application Ser. No. 14/426,733 (incorporated herein by reference), as well as in in *Development of a Residential Integrated Ventilation Controller*, by I. S. Walker, M. H. Sherman and D. J. Dickerhoff, the latter of which introduces a Residential Integrated Ventilation Controller (RIVEC), a related system, and the concepts of "time shift" and "integrated ventilation," as follows:

Time Shift—Within a 24 hour period, move ventilation from the peak time periods of the day (hot or cold) to another period and over ventilate to compensate; this notion was proposed by implementing an on/off fan system with a fan operable at a speed that provides air flow (e.g., in CFM) at a rate greater than the nominal rate needed were the fan operated continuously over a 24-hour period, whereby instead the fan is turned off at certain time periods, at yet when turned on at other time periods, due to its higher than nominal speed, the fan attempts to ventilate air in greater volume than the nominal 24-hour value (i.e., the higher speed, if the system is operating properly, should flow air greater than the nominal value envisioned during a 24-hour continuous ventilation).

Integrated Ventilation—Capture the mechanical ventilation impacts of all powered ventilation in the space (bath fans, dryer, range hood, other fans) and deduct from the amount needed.

The preceding work (Walker, Sherman and Dickerhoff) and concepts were revolutionary when originally presented and may well be central to the long term vision of using software (smart ventilation) to integrate with available hardware to deliver on the promise of the best possible set combination of events, delivering the highest amount of mechanical fresh air with the least amount of energy penalty and with the least possible discernable impact on the lives of the occupants of the space. A problem, however, is that no manufacturer uses RIVEC. The program, as described by one major manufacturer was merely highly theoretical and not yet ready for commercial application. It is also recognized in connection with the preferred embodiments that another drawback of RIVEC is that it does not capture humidity and/or address comfort issues, which as shown later herein facilitates and provides numerous additional benefits. Further, the program, as written, requires the ventilated space to comply with the ASHRAE Standard on a 24-hour basis, regardless of its impact on energy, humidity, and comfort—as therefore recognized and addressed by the preferred embodiments, the RIVEC approach, by rigidly complying with a 24-hour time limit, is forced to ventilate during periods which may be undesirable to building occupants, due, for example, to high temperature or high humidity, and also ventilating during such times is likely to bring a large energy cost. Thus, the impact of this compliance creates problems that have been seen as insurmountable because there still is no acceptable solution with all the competing priorities. Walker and Sherman partially address this conundrum with the "Theory of Equivalence," that allows for same-day time shifting to less extreme outdoor air conditions and provides the "equivalent" amount of acceptable indoor air. Yet, it is recognized in connection with the preferred embodiments that even this 24-hour time period is too constraining when dealing with humidity changes. The preferred embodiments, therefore, provide more optimized solutions to deliver an end result representing an improved, if not the best, possible set of tradeoffs between the required ventilation and the energy, comfort, performance, cost, and value proposition, so as to actually deliver a long term increase in fresher outdoor air leading to better and cleaner indoor air and having a positive impact on indoor elements of public health.

Figure 2A:
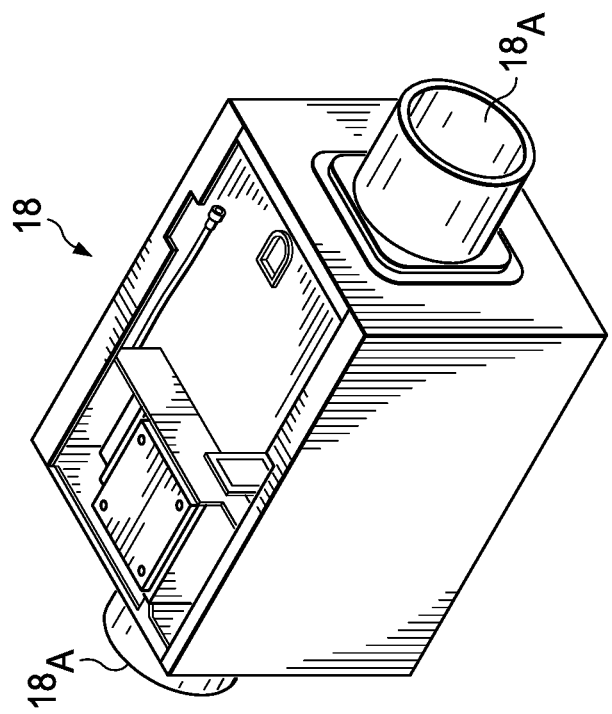
FIG. 2A illustrates a perspective view of a volumetric enclosure serving as duct 18 according to a preferred embodiment.
Figure 2B:
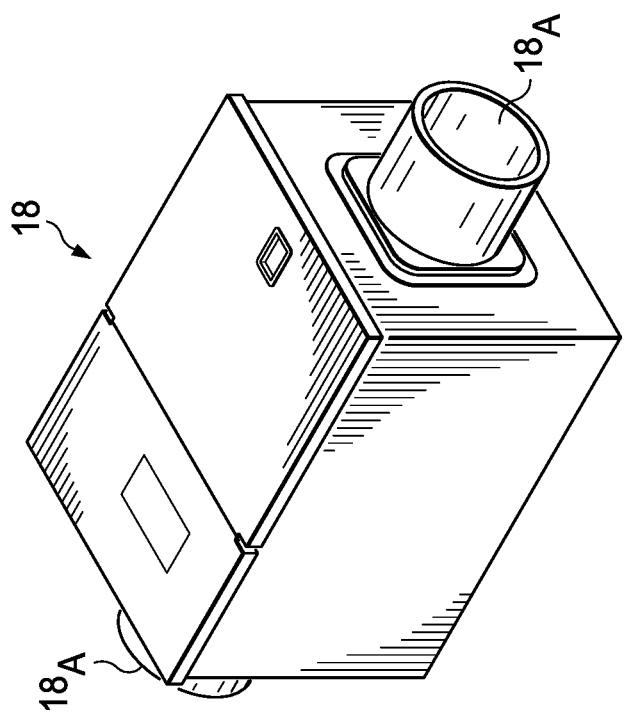
FIG. 2B illustrates the view of FIG. 2A with a top cover removed so as to reveal a location of the controller assembly.
Figure 2C:
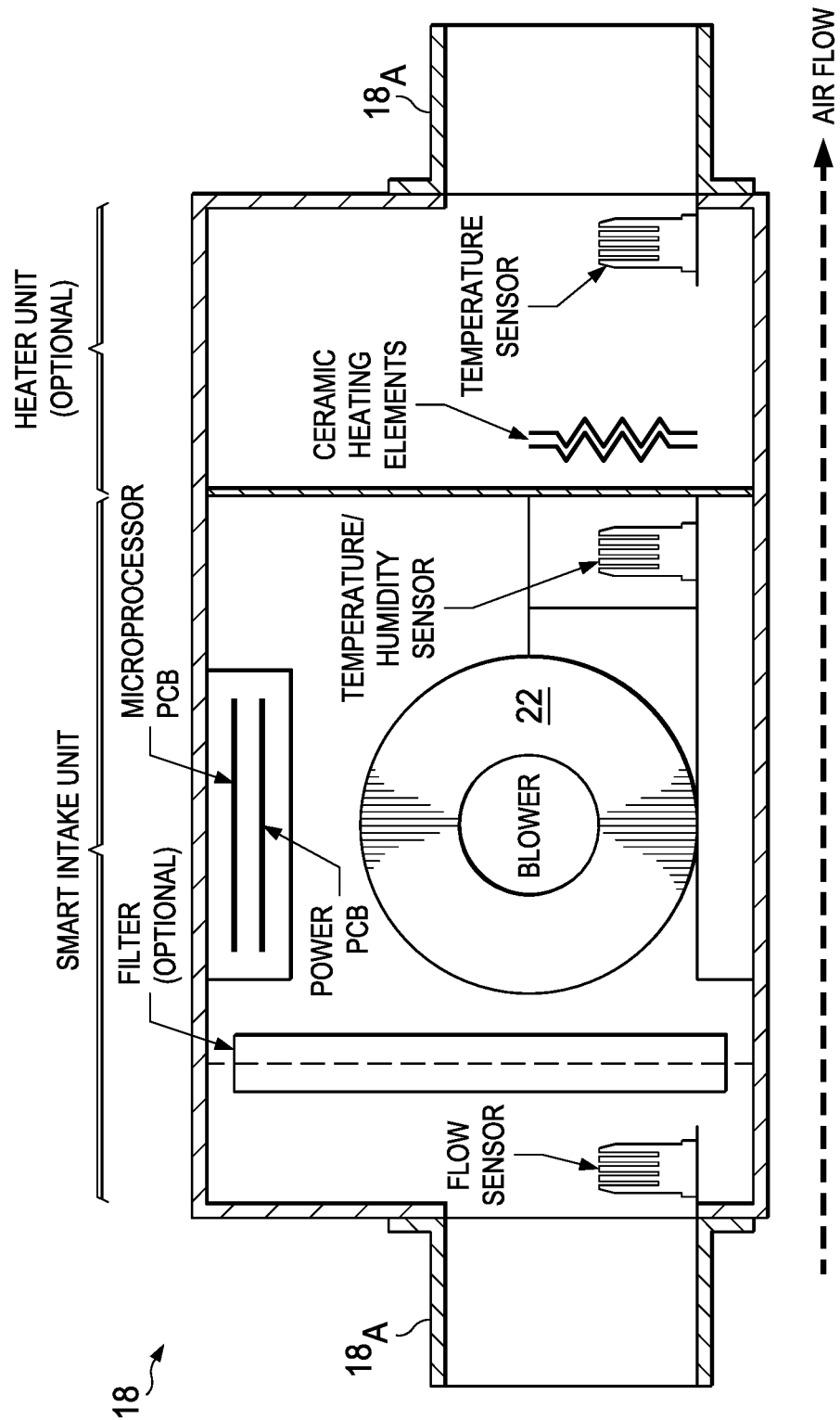
FIG. 2C illustrates a cutaway side view of FIGS. 2A and 2B, with various elements shown in block form.

FIG. 1 illustrates an electrical block diagram of a controller 10 according to a preferred embodiment. Controller 10 includes, or alternatively may communicate, via wire or wireless interface, with a separate device that comprises, a Climate Sensing Control Module (CSCM), as detailed in co-authored U.S. patent application Ser. No. 14/426,733, which is fully incorporated herein by reference. The reader is invited to review that patent application in its entirety, so by way of context herein CSCM 12 includes apparatus $14_T$ for setting a temperature range and apparatus $14_{RH}$ for setting a relative humidity (RH) range (and/or dew point, grains of water, other). CSCM 12 further communicates with temperature/RH sensors 16 in an air duct 18 or some other volumetric enclosure through which air may pass and that accommodates the apparatus and methods described herein, where the enclosure may be in-wall or connected via adapters 18A (also referred to as take-offs, for reasons evident later in connection with FIG. 10) to other ductwork as part of, or independent of, the building HVAC system. A perspective view of such a volumetric enclosure serving as duct 18 is illustrated in FIG. 2A, while FIG. 2B illustrates that view with a top cover removed so as to reveal a location of the controller assembly and FIG. 2C illustrating a cutaway side view with various elements shown in block form.

Air sampled through duct 18 is exterior air relative to a building 19, where such sampling may be achieved by controlling a fan 22 to rotate at a relatively slow speed, so as to draw that air past one or more sensors 16, located within the duct 18. In one preferred embodiment, fan 22 is an AC motor, and through one or more relays may be controlled to one of different speeds, include a speed of zero, that is, thereby disabling the fan from moving air through duct 18. In an alternative preferred embodiment, however, fan 22 is a DC fan (or ECM fan). In devices such as the preferred embodiment, overall cost is a factor for various reasons including marketplace demand and acceptance, which may incline toward the first preferred embodiment of an AC fan. The alternative preferred embodiment use of a DC fan, however, should become more acceptable as costs associated with such a fan decrease, and as further detailed in this document, sensing or otherwise detecting fan speed is an aspect in certain preferred embodiments, and for a DC fan such a detection is readily ascertainable from the drive signal to the fan, which will be proportional to the fan speed. Moreover, an AC fan typically has a speed determined by the manufacturer and may be fixed by a capacitor connected to the fan motor; in contrast, the DC motor can be controlled with a signal to variable speeds, an aspect which is desirable in the preferred embodiments whether by AC or DC fan. Indeed, as further evident below, variable speed is preferred as controller 10 preferably includes a control loop whereby as parameters associated with air flow or duct 18 change, controller 10 alters the speed of fan 22, and in this regard ultimately a DC fan will prove more readily adjustable, setting aside issues of cost (or including them, as cost of such fans decrease).

Looking in more detail at speed control of fan 22, in one preferred embodiment, if, in the Custom mode of operation, the sampled exterior air meets both of the ranges established by apparatus $14_{RH}$ and apparatus $14_T$, CSCM 12 enables fan 22 to mechanically ventilate the building interior, by thereby drawing exterior air into building 19. To the contrary, if either (or any) of the ranges established by apparatus $14_{RH}$ and apparatus $14_T$ is not met, CSCM 12 disables fan 22 (i.e., so as to reduce its speed to zero), so as to stop the mechanical ventilation of air through air duct 18 until a next periodic sample is taken; at that time, controller 10 temporarily disables the fan 22 for a period of time, such as for 2.5 minutes every 15 minutes of the hour, to determine if the conditions are then satisfied. If the condition remains unsatisfied, controller 10 stops the fan 22 and, at the next 15-minute increment, the sampling process repeats. Eventually, once the conditions are satisfied, controller 10 enables fan 22 to run at a speed at least equal to that to meet the ASHRAE standard. Thus, the preceding preferred embodiment methodology allows the system to provide the very positive impact of providing approximately 10 to 20 minutes of fresh air every hour because the fresh air machine runs for about 2.0 to 5.0 minutes every 15 minutes, irrespective of temperature or humidity, thereby providing at least some ventilated air, as may be appreciated in part toward at least partial compliance with a standard (e.g., ASHRAE or otherwise). Additionally, with this automatic change of fan speed, a preferred embodiment reduces the potential negative impact of sampled air. Potentially, in cases of extreme outdoor temperature or humidity, potentially quantified by means of relative humidity, dew point, grains of water and/or another metric, or if the system could not vary fan speed, it is possible that a nominal or standard CFM setting for the duct 18 might bring in too much undesirable air during the sampling period. By automatically being able to downshift to the lowest fan speed possible, this negative potential is dramatically reduced, thus offering significant additional benefit. In addition, when conditions improve, controller 10 will identify such a change (through the sampling process every 15 minutes) and may automatically increase the speed of fan 22 to a standard setting. Numerous other details in connection with CSCM 12, and related apparatus, are described in the incorporated U.S. patent application Ser. No. 14/426,733.

Further in connection with the preferred embodiments, controller 10 also includes various additional electrical hardware and software, so for example controller 10 may be implemented in connection with a printed circuit board (PCB), as described in block and functional diagram terms later in connection with FIG. 14. As known in the art, a PCB, or multiple PCBs that operate in conjunction with one another, may include one or more separate integrated circuits, typically interconnected by various interfaces that may be wired or wireless, as well as with power, and other forms of input/output—in FIG. 2C, for example, the PCB circuits described herein are separated into a first microprocessor PCB and a second power PCB (e.g., including relays, capacitors, and electrical interface such as Molex). In addition, another preferred embodiment is a distributed system which moves some communication and control measures from a PCB attached relative to or inside duct 18 into another device, such as an existing or developed thermostat control board and then having two-way communication between the other device, a network (e.g., the Internet (which is already well established)) and unit 18. In any event, the one or more PCBs in the preferred embodiments include some form of programmability, as may be achieved by a microprocessor, microcontroller, digital signal processor, dedicated application specific integrated circuit, or others as may be ascertained by one skilled in the art. Further, myriad functionality is included in the preferred embodiments and detailed herein, as may be implemented by adequate programming, in combination with one or more of the above-noted programmable devices. Such programming is therefore stored in some type of computing device readable media, such as in onboard or separate memory, which may include non-volatile memory to store part of the programming permanently as well as flash or other upgradeable memory so that functions may be updated or added to the programming after the device is originally manufactured. Various of these aspects are shown later by way of the block diagram in FIG. 7 and the controller illustration of FIG. 14.

Also by way of further introduction, controller 10 further includes an input/output interface 200, as may be accessed by a user of the controller, whether that is an occupant of building 19 under control by controller 10, as well as an installer or a person involved in the verification or commissioning of the overall ventilation achieved in FIG. 1, as may be required according to various codes (e.g., ASHRAE) once the system is initially installed relative to a building. For sake of demonstration, in the illustrated preferred embodiment of FIG. 1, input/output interface 200 includes a display 202 which may be a one-way informational display, such as achieved in contemporary LCD or LED technology, or it may be a two-way device in the sense of being touch-sensitive so that any user may input information via the display, such as by touching options depicted on that display. Alternatively, such as to maintain lower costs, one or more external buttons 204 are included and proximate display 202, where either each button may have a fixed function or may be associated with a function that is depicted on display nearby a respective one of the buttons 204. Note also that other input/output interfaces may exist so as to permit communication between controller 10 and a user. For example, controller 10 may further include one or more wired or wireless interfaces that will communicate information to an additional device. Preferred embodiments include as such alternative devices a smart phone, tablet, laptop, or even a dedicated remote control that has its own user interface (e.g., screen, buttons, cursor control and the like) wherein information may be input by, and displayed or provided to, a user of the alternative device.

FIG. 3A again illustrates some of the aspects shown in FIG. 1, with additional details with respect to measuring, and preferably displaying (and optionally reporting remotely) an air flow measure through duct 18. Specifically, in a preferred embodiment, duct 18 includes apparatus for measuring such air flow (e.g., as indicated by a unit such as cubic feet per minute, CFM), and the measure is communicated to controller 10. Further, the flow information may be both requested by, and output to, input/output interface 200. By way of example, therefore, FIG. 3A illustrates the legend "CFM MEASURE" proximate a button 204$_1$ to indicate that a user may depress that button, thereby causing controller 10 to evaluate pressure and fan speed as mentioned above, with the result conveyed to the user, such as by displaying it on display 202. As detailed in various locations of this document, incorporating air flow measure into duct 18 and in combination with controller 10, and further without the need for additional external apparatus and minimal (if any) user input, provides numerous advantages over the prior art, including by ways of example: (i) providing anyone having access to display 202 a real time indication of achieved CFM, for example to a consumer as reassurance that its ventilation system is operable or to a person commissioning the system in connection with installation, thereby providing quick and accurate commissioning of duct 18 at or soon after the time it is installed; (ii) passage of inspection and/or compliance satisfaction in connection with building permit acquisition and the like; (iii) subsequent monitoring and reporting of system operability and standard compliance; (iv) creation of a new opportunity, if not industry, arising from the ability to monitor long term air flow patterns in view of various parameters, thereby assisting with adjustments of air flow standards, greater consumer satisfaction, and very importantly, in reducing energy loads and thereby facilitating greater acceptance as well as a viable option in compliance with measures such as home energy rating system (HERS) and energy rating index (ERI) measures. Moreover, preferred embodiments contemplate alternative apparatus for achieving the flow measure through duct 18, as further explored below.

In one preferred embodiment example, and as indicated generally in FIG. 3A, duct 18 therefore includes one or both of an air inlet side pressure sensor 206 and an outlet side pressure sensor 208, with fan 22 therefore being located between the two sensors. Controller 10 receives signals from one or both of sensors 206 and 208, and programming in controller 10 combines the pressure (or changes in such pressure) with the speed of fan 22 (as may be known from the enabling signal then applied to fan or from a separate fan speed sensor), and controller 10 then applies a formula from which the CFM flow may be determined.

Figure 4:
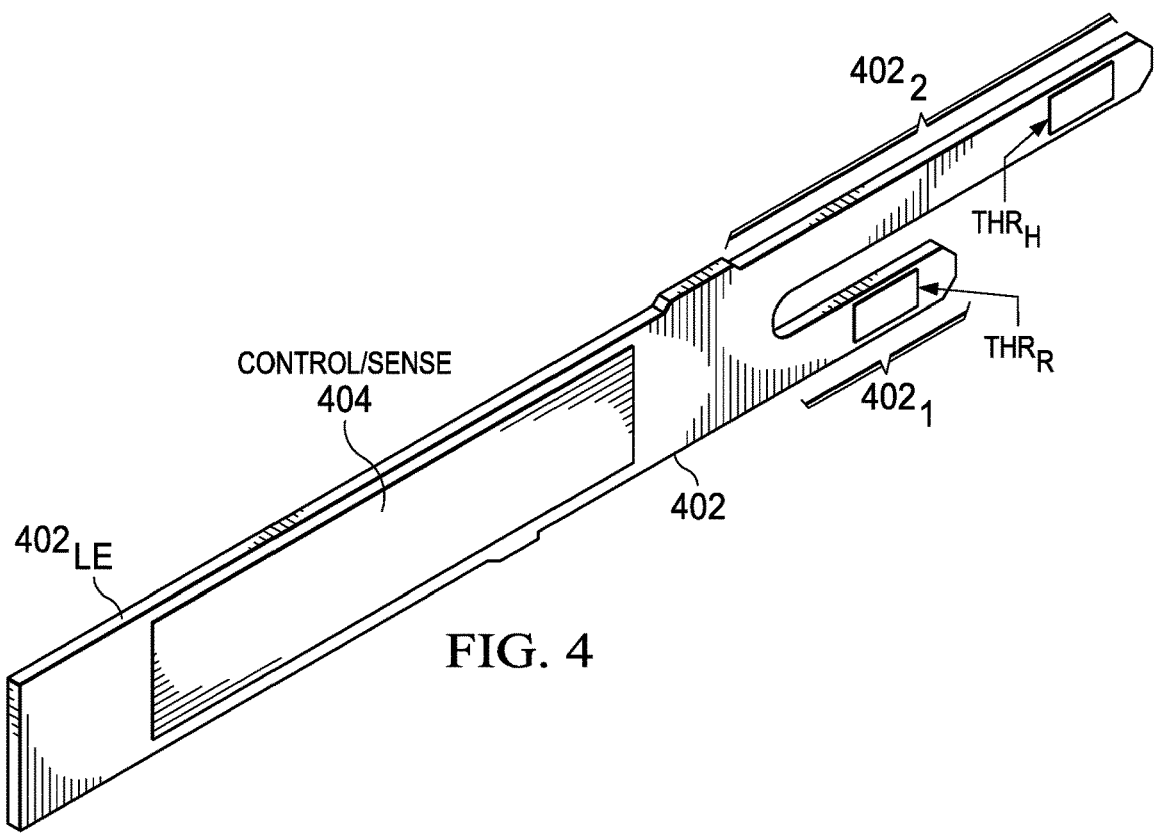
FIG. 4 illustrates a preferred embodiment air flow sensor on a printed circuit board
Figure 5:
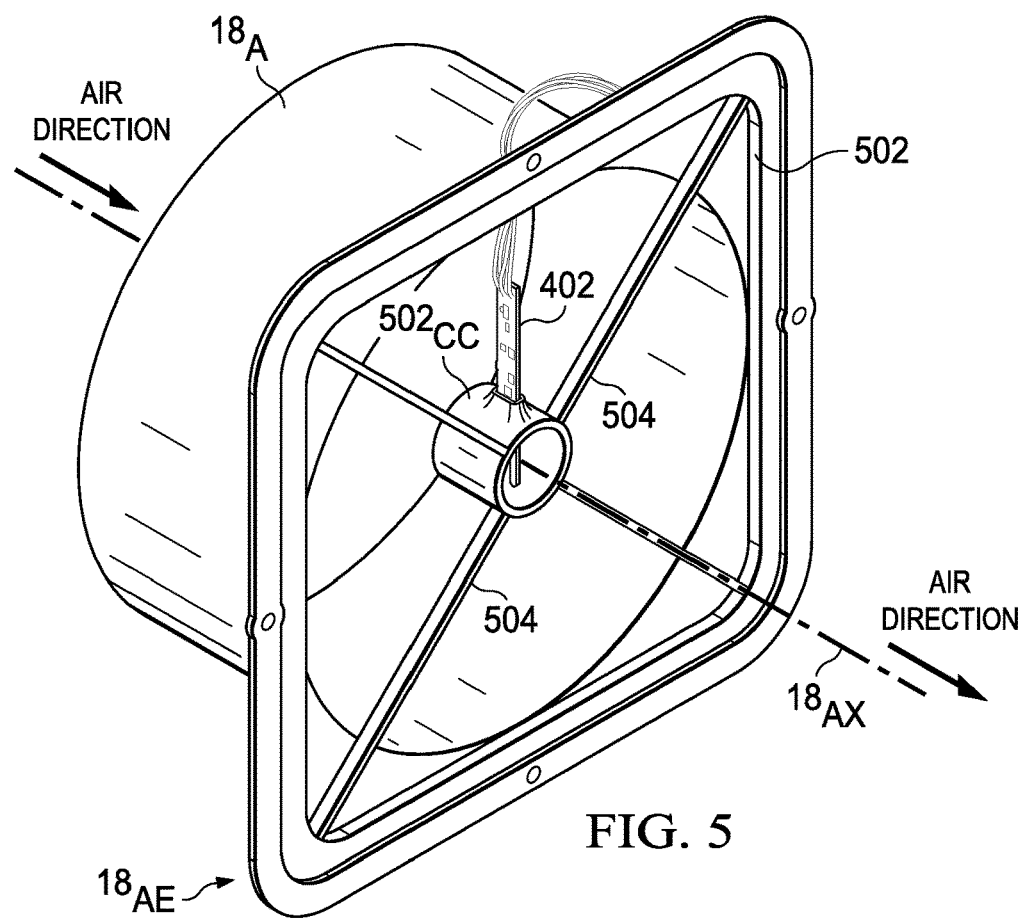
FIG. 5 illustrates a frame for mounting the FIG. 4 air flow sensor in a position at an inlet end of duct 18 so as to minimize disturbance in laminar flow across the sensor.

In another preferred embodiment example, and as now described in connection with FIGS. 4 and 5, duct 18 incorporates a "hot wire" flow sensor or anemometer (or multiple ones of such sensors) so as to determine air flow through duct 18. As known in the hot wire anemometer art, such a device typically comprises a reference thermistor $THR_R$ and a heated thermistor $THR_H$, as shown in FIG. 4 mounted on a preferred embodiment printed circuit board (PCB) or some other circuitry supporting substrate 402, where preferably the thermistors are sufficiently distant from one another (e.g., at least 0.25 inch) so that heat from heated thermistor $THR_H$ does not affect the reference measure achieved by reference thermistor $THR_R$. PCB 402 also supports control/sense circuitry 404, connected to thermistors $THR_R$ and $THR_H$, whereby such circuitry is operable to measure a signal from reference thermistor $THR_R$ representative of ambient temperature, and to provide a drive current $I_D$ to heated thermistor $THR_H$ so as to heat the latter to, and retain it at, a reference point temperature, and to determine the amount of drive current $I_D$ to retain such temperature. Note in this regard that in one preferred embodiment, positive temperature coefficient (PTC) thermistors may be desirable and in which case circuitry 404 includes generally analog circuits that are ascertainable by one skilled in the art; however, in that the preferred embodiment includes microprocessor functionality associated with controller 10, then an alternative preferred embodiment may leverage of some of that functionality to support negative temperature coefficient (NTC) thermistors, which may provide a reduction in cost and greater accuracy, albeit with certain implementation complexity, but the latter is ameliorated with the existence of the microprocessor already as part of the overall system. In any event, control/sense circuitry 404 provides and thereby may detect the amount of drive current $I_D$, which is proportional to air flow in that heat provided to heated thermistor $THR_H$ is removed by convection via the air flowing across that device—hence, the greater air flow across the device removes more heat and requires more drive current $I_D$, where one skilled in the art will thereby understand that circuitry 404 comprehending the level of $I_D$ in combination with the ambient reference measure is thereby operable to determine the amount of air flow, again for example in measure of CFM (or otherwise). Further, sensor development research indicates that the sensor requires at least one minute (based on its location) to adjust from ambient air and capture real performance of the outdoor air conditions (i.e., temperature and humidity). Moreover, in connection with the preferred embodiments, it has been found that the preferred embodiment anemometer provides sufficiently accurate readings, even in the presence in some instances of debris carried by the air (e.g., dust).

Further implementing the hot wire anemometer technology in the preferred embodiment, note that PCB 402 preferably includes a main body portion and at a distal end supporting thermistors $THR_R$ and $THR_H$ so that heated thermistor $THR_H$ is preferably closes to axis $18_{AX}$ than is reference thermistor $THR_R$. In one preferred embodiment, therefore, the body of PCB 402 includes first and second extensions $402_1$ and $402_2$, supporting thermistors $THR_R$ and $THR_H$, respectively, where second extension is $402_2$ is longer than first extension $402_1$. This differential in length is further appreciated with reference to FIG. 5, wherein PCB 402 is shown affixed relative to an adapter 18A for duct 18. Particularly, in FIG. 5, adjacent an end $18_{AE}$ of adapter 18A, a PCB frame 502 is located to physically support PCB 402 and to further directionalize air flow in a manner toward optimal or improved laminar flow so that air flow measures obtained by PCB 402 have reduced error. In an preferred embodiment, frame 502 is located at the inlet end of duct 18, either mounted in adapter $18_A$ or, as shown in FIG. 5, fitting between the flanged end of adapter $18_A$ and the end wall of the generally outer parallelepiped shape of duct 18, that is, as adapter $18_A$ is attached to the remainder of duct 18, frame 502 is retained between the two, and a gasket or the like also may be used so as to provide a desirable seal. PCB frame 502 further includes one or more suspension elements 504, extending from the perimeter of the frame toward the axis $18_{AX}$ of adapter $18_A$, whereby the suspension element(s) 504 ultimately provide a support so that PCB 402, in one preferred embodiment, can be located substantially away from the inner walls of adapter $18_A$, and more preferably so that heated thermistor $THR_H$ is preferably aligned with axis $18_{AX}$; other locations within adapter $18_A$ are also contemplated. In any event, in the preferred embodiment illustrated, therefore, note that the longer length of second extension $402_2$ desirably locates heated thermistor $THR_H$ at axis $18_{AX}$, while the relatively shorter length of first extension $402_1$ thereby positions reference thermistor $THR_R$ sufficiently proximate heated thermistor $THR_H$, but at the same time reference thermistor $THR_R$ is away from axis $18_{AX}$, as this latter reference thermistor $THR_R$ is not susceptible to inaccurate measures from air turbulence, as is heated thermistor $THR_H$. Moreover, PCB 402 is positioned so that its lateral edge $402_{LE}$ is facing and in line with the direction of air flow through adapter $18_A$ and with such flow entering the intake side of duct 18, the air flow is only disturbed moderately by such edge while otherwise it flows in the same direction as the width of the front and back surfaces of PCB 402. Moreover, in this orientation, as air flows into adapter $18_A$ and incurs PCB 402, the reach first reaches, and passes over, heated thermistor $THR_H$, before reaching, and passing over, reference thermistor $THR_R$; in this orientation, therefore, first the later edge $402_{LE}$ has a lesser disturbance on the laminar flow of air into adapter $18_A$, and with the ordering of the thermistors as described, and disruption in that flow that could arise from reference thermistor $THR_R$ occurs after the air already has passed over heated thermistor $THR_H$, so that the measure by the latter is unaffected by the former. Thus, the preferred frame 502 and the shape and orientation of PCB 402 centralize the location of heated thermistor $THR_H$ along axis $18_{AX}$ while positioning reference thermistor $THR_R$ in a line parallel to that axis and also downstream (in terms of directionality of air flow) from heated thermistor $THR_H$, all of which contribute to better accuracy in the CFM measure obtained from the device. Lastly, note that other aspects are, or may be, incorporated into frame 502, again so as to reduce the possibility for disturbing laminar flow across the CFM sensing device, thereby reducing any degradation of its measurement accuracy. For example, member 502 also supports a central cylindrical portion $502_{CC}$, which is oriented by frame 502 with its axis co-aligned with axis $18_{AX}$. As another example, central cylindrical portion $502_{CC}$ is retained by four symmetrically-positioned members 504, each spaced 90 degrees apart from one another in a place perpendicular to adapter $18_A$. Note also that while PCB 402 is shown in FIG. 5 with its lateral edge $402_{LE}$ exposed to the air direction through adapter $18_A$ and between members 504, in an alternative preferred embodiment PCB 402 will be encased or enclosed within a member 504 and so that the two extensions $402_1$ and $402_2$ extend therefrom into the inner diameter of central cylindrical portion $502_{CC}$, so as to further reduce any asymmetry in air flow through adapter 18A that could arise from the existence of the majority of length of PCB 402, thereby further reducing any distortion in laminar flow and enhancing the air flow measure from the device. Lastly, note that the positioning of PCB 402 in adapter $18_A$ is preferable so as to avoid any laminar flow disturbance (or eddy flow) that is more likely to occur toward, or within, the irregularities created by the outer shape and inner devices within the volumetric enclosure of duct 18; additionally, components therein (e.g., fan motor) may provide heat that could interfere with the temperature sensitivity of the measure by the hot wire anemometer. With such preferred positioning, the sensor is able to differentiate between fan flow and turbulence from air blockage. In contrast, locating the sensor too close to the thermal mass of the fan 22 could impact the data (and thusly deliver false readings) because it is located too close to the thermal mass of the motor windings in which case the sensor(s) may not overcome the heat generated by the windings. Additionally, locating the sensor too close to the fan 22 impeller also could cause false readings as the sensor may be unable to distinguish between air flow and turbulence from the impeller.

Note that the above apparatus is believed to be the first automated apparatus for determining air flow through residential mechanical ventilation apparatus, particularly with, or optionally available by, the user only needing to actuate a function, such as with the depressing of a single button, on a controller or the like. With this preferred embodiment, a user is able to capture, for multiple purposes, the amount of cubic fresh air (CFM) delivered by a properly installed duct 18. This is an opportunity for solving significant problems in mechanical ventilation as the amount of actual, delivered air is a key component for so much of the evaluation of a successful installation. Indeed, in contrast, the current state of the art for determining air flow in ventilation systems is a significant problem for the oversight organizations of the companies who currently measure and report whether or not a particular ventilation installation meets the required air (CFM) flow once the ventilation product is installed. Current field testing methods are crude and unreliable in terms of delivering repeatable test results. As a result, the oversight organization, RESNET, has proposed Standard 380 which adds significant additional field work to ensure that these crude field methods become slightly less crude. Currently, dedicated test ports and at least three feet of straight hard pipe to settle the air flow are required to be added to the ventilation system, thereby adding complexity, cost, and burden to the HVAC contractor/installer, and typically these factors are passed on to the consumer as an additional cost. Moreover, sophisticated (and expensive) probes with multiple sensors also are required to interact with the test ports and such probes thus are required for each field energy rater. All of this is designed to slightly improve the capture method of the ventilation machine to see if it has the capacity to deliver airflow to the ASHRAE standard for that particular building and if it is delivering the airflow that the HVAC company set during the original installation. This is important because many ventilation products/systems under-deliver fresh air and the actual installation of ductwork to the mechanical ventilation device often adds unanticipated static pressure and causes otherwise reliable delivery systems to underperform. In contrast, the preferred embodiment may be actuated to provide CFM without the prior art necessities, and it may be activated simply by a user at a point in time, or controller 10 may be programmed to self-actuate the CFM measure periodically or continuously over a period of time, where measures are taken continuously and reported during that time period. Moreover, as detailed later, in addition to the reporting the CFM result on display 202, because of the memory and communication interfaces of controller 10, such information may be transmitted elsewhere and stored in a database or the like for both real time and historic monitoring and evaluation. Moreover, the ability of the system to be tested as described after installation is therefore inclusive of the actual duct work and fan static pressure involved. Note further that the above may be configured according to a methodology for capturing CFM with a fan as established in Air Movement and Control Association (AMCA) standards. Indeed, while the preceding described pressure transducers and hot wire technology, having contemplated integrating air flow measure into the air duct 18, still other techniques may be incorporated to achieve such measures. In any event, the preferred embodiments for the first time provide mechanical ventilation products the ability to self-capture CFM in the duct 18 machine/apparatus, providing users, installers, testers, and all others of interest a standardized, repeatable methodology that reports the CFM through duct 18, as may be tested during the commissioning or review process.

In an additional preferred embodiment as detailed later, controller 10 is operable to actuate fan 22 to operate at a speed beyond that required by the (e.g., ASHRAE) standard, so as to "over-ventilate," meaning to provide air flow above that required by the standard, where such over-ventilation may be defined in periods greater than 24 hour increments. As proposed herein, such over-ventilation may have numerous benefits and indeed may be found to be a new paradigm for providing benefits to fresh air ventilation while overcoming, or at least reducing, many of the drawbacks of the prior art and the shortcomings of the current standards. In this regard, the illustration and discussion of FIG. 3A is further repeated in FIG. 3B, but there the display 202 depicts both a standard CFM measure and a maximum CFM measure, described as follows:

(1) standard CFM measure: is the measure of air flow achievable by controller 10 and duct 18 when the fan 22 is enabled so as to comply with the standard (e.g., ASHRAE; code standard, or other setting that is typically fixed at time of commissioning); and (2) maximum CFM measure: is the measure of air flow achievable by controller 10 and duct 18 when the fan 22 is enabled at its highest speed.

Given (1) and (2), above, this allows the commissioning technician or the review technician to quickly determine whether the ventilation system, as installed with all duct work and other air flow affecting devices (e.g., filtration), will have the capacity to deliver to the ASHRAE standard for that building or even exceed that standard. Moreover, the maximum CFM measure provides assurance of performing at or above the standard, even if conditions potentially change after the installation (e.g., debris accumulation).

Further, the maximum CFM measure provides an indication that one or more speeds of fan 22 can be achieved so as to ventilate above the standard, where as detailed throughout this document it may be desirable to "over-ventilate" in this manner at certain times, either as exterior conditions are particularly ideal for purposes of ventilation or to make up for times when the system was controlled by controller 10 to operate at a CFM level below standard that is to under-ventilate, so that the combined periods of over-ventilating and under-ventilating combine toward satisfying the standard. Thus, the volume of air over a period of over-ventilation is effectively banked or credited against the volume of air over a period of under-ventilation, whereby the aggregate over time can be evaluated as against a standard, or indeed so as to adjust the standard or render the standard variable so that it may apply to changing conditions, rather than the currently-envisioned standards that are statically established based on building size and expected full occupancy. Thus, the preferred embodiments permit flexibility of a standard to actual conditions even based on a per building application, rather than theoretical ones that are derived to fit across large swaths of communities or behaviors. This is indeed an extreme advantage over the state of the art, where there is disagreement among building scientists about the recommended amount of mechanical fresh air. So, while the standard says the system must have the ability to deliver the amount of fresh air as required, the occupant or other person accessing controller 10 can change the amount of fresh air to what is desired. Occupant preferences are written into the standard. Having the unique ability to report the "standard setting" and the "maximum setting" at the same time is a time and cost savings for both the HVAC installation company and the energy rating oversight company. In addition, the apparatus and method will allow for a very simple "one touch" push of a button to capture these CFM numbers.

Figure 6:
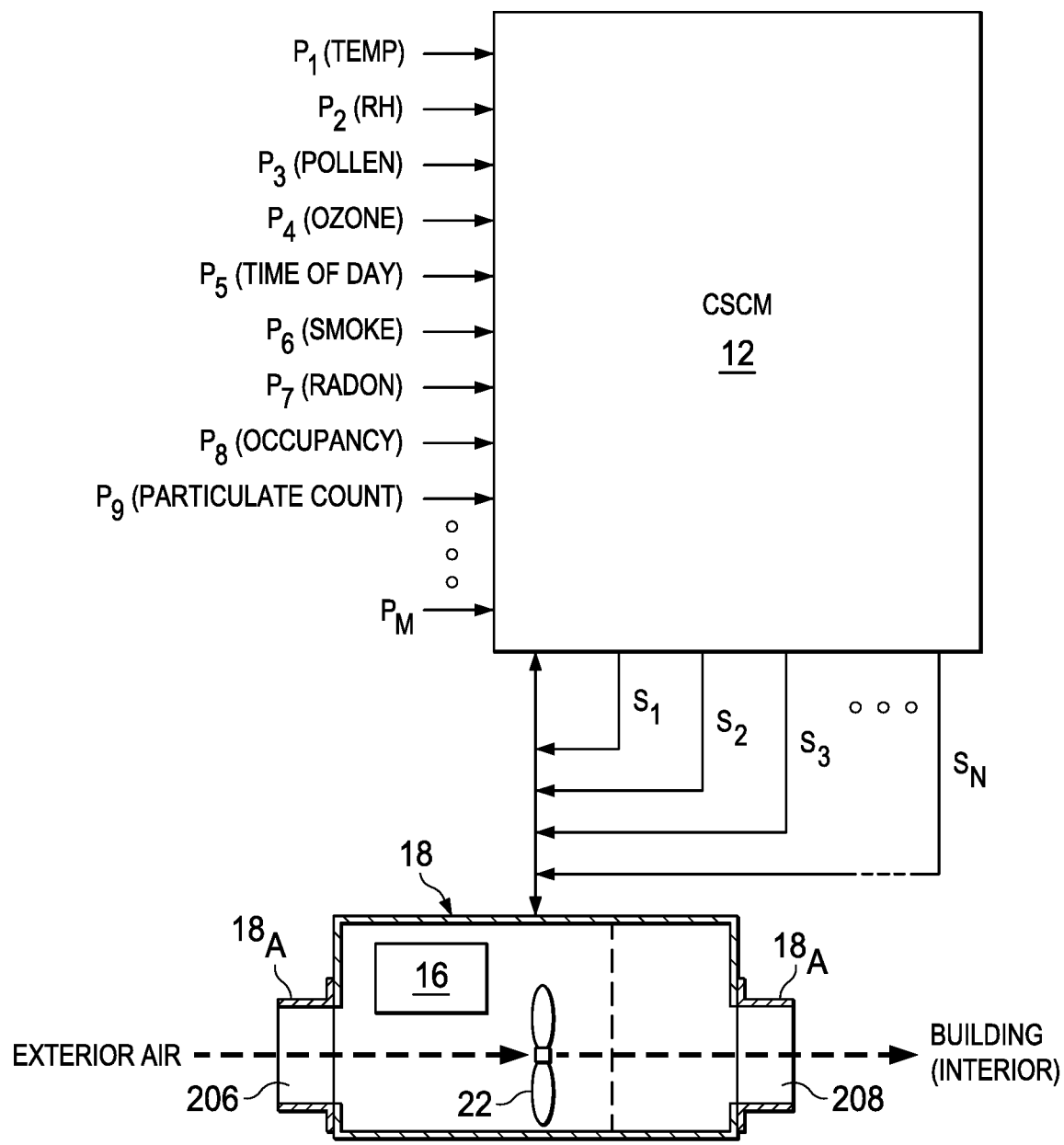
FIG. 6 again illustrates CSCM 12 and duct 18 of FIG. 1, with an additional number M of different parameters, $P_1$, $P_2$, and so forth through $P_M$ as inputs to CSCM 12.

FIG. 6 again illustrates CSCM 12 and duct 18 of FIG. 1, with additional details for a preferred embodiment relating to CSCM 12. Specifically, in an earlier-described preferred embodiment, CSCM 12 responds to two measured parameters, namely, temperature and humidity (quantified as relative humidity, grains of water, dew point and/or other), as compared to inputs for comparing user desired limits as to those parameters. In other preferred embodiments, however, one or more additional parameters also may be input to CSCM 12, where note that such parameters may be obtained by controller 10 including sensors that sample air periodically (e.g., every 15 minutes) to measure the parameter or whereby there are separate sensors on controller 10 that may sense air, or receive remote communications, independent of air moving through duct 18, as further detailed later. In any event, in response to such parameters, the programming of controller 10 further responds to adjust the speed of fan 22 down to zero, or any speed above zero at which the fan 22 is capable of operating of in response to those parameters, and where the timing of the speed change may be made real time in response to a parameter measure or be deferred to a later time so as to time shift the ventilation to compensate for one or more parameters exceeding a respective range or threshold. FIG. 6 illustrates these aspects by illustrating a total number M of different parameters, $P_1$, $P_2$, and so forth through $P_M$ as inputs to CSCM 12, and three or more different speeds up to N different successively higher speeds and potentially starting from a speed of zero, shown by way of diagram in FIG. 6 as speeds $S_1$ through $S_N$, where each speed is expected to generate a respective different amount of CFM through duct 18. Note that the various speeds may be achieved in different manners based, for example, on the type of motor driving fan 22. For example, for an AC motor, each different speed may be a fixed setting, such as is achieved by the configuration of the motor and its supporting circuitry; where the motor is a DC motor, again fixed setting may be used, but a greater number of speeds, or even complete variability in speed, is contemplated as the latter type of motor is more readily controllable with speed directly proportional to a drive signal, and note further that such a signal also is therefore easily usable as a reference for fan speed. In any event, therefore, the CSCM 12 and/or controller 10 may be expanded, for example in a Custom mode, to communicate three or more different speeds up to N different successively higher speeds, where each speed is expected to generate a respective different amount of CFM through duct 18. Moreover, if the parameters indicate that the conditions of exterior air are acceptable, for example if such conditions do not exceed any range or limit indicated by the parameters as undesirable, then speed $S_N$ is asserted to duct 18, thereby rotating fan 22 at its highest maximum speed and thusly obtaining the maximum possible CFM through duct 18, given the constraints of fan speed and any other flow considerations of duct 18 or the remaining air channel that is in fluid (i.e., including air) communication with duct 18. As introduced earlier, such a CFM level is preferably greater than that required by the standard, so during such an instance duct 18 can be said to be over-ventilating, again meaning flowing air in excess of that which is expected to be continuously flowed according to the standard. Thus, the following Table 1 summarizes each parameter number and the correspondence parameter information that is input to CSCM 12, preferably by including with controller 10 either a sensor to evaluate the input or some other mechanism for communicating the value of the parameter to CSCM 12. As to the latter, for example, rather than relying on a sensor for each parameter, some parameters may be determined from another device, such as from a database accessible on a network, including the Internet, where controller 10 may communicate with that database, including by way of example having controller 10 include a circuitry or other appropriate module to communicate as part of the Internet of Things (IoT) or some other wired or wireless protocol.

TABLE 1

| Number | Parameter |
|---|---|
| $P_1$ | temperature |
| $P_2$ | humidity |
| $P_3$ | pollen |
| $P_4$ | ozone |
| $P_5$ | time of day |
| $P_6$ | smoke |
| $P_7$ | radon |
| $P_8$ | occupancy (and/or motion detection) |
| $P_9$ | particulate count (Ex. PM 2.5, and/or PM 5.0) |
| $P_{10}$ | Carbon Dioxide |
| $P_{11}$ | Carbon Monoxide |
| $P_{12}$ | Formaldehyde |
| $P_{13}$ | VOC (volatile organic compounds) |
| $P_{14}$ | $NO_2$ |
| $P_{15}$ | Acrolein |

Given Table 1, one skilled in the art may employ suitable programming to accept the data of each (or some subset of parameters) and also to solicit either from the user or the installer an acceptable limit or range for each such parameter.

For example, with respect to parameter $P_3$, if the pollen count is above a certain limit for an occupant who tends toward pollen allergies, that limit may be input by CSCM 12 or the other programmable portion of controller 10. Accordingly, controller 10 can lower the speed $S_x$ of fan 22, indeed all the way to zero, when it detects (via an appropriate sensor or from data provided from a remote source) that pollen is beyond the acceptable limit.

As another example with respect to parameter $P_5$, if the building occupant prefers ventilation to be greater in the evening when exterior air conditions are likely to be more pleasant, a time of day indicator or range of time may be so input. Thus, the user, installer, or programmer may select hours of run time or hours of not run time. One example is just to run for several hours at full speed $S_N$ every night after a place of business closes or after everyone in the occupied space is asleep. Another example of hours selected for not running would be for an urban multifamily project located next to a major highway, which has become a common installation. By selecting specific time periods when the fan will not run, the installing technician, occupant or other programmer can program out times when there will be higher auto emissions from highway rush hour (morning and afternoon) and thereby reduce the potential for the ventilation system to bring air into the space with outdoor air pollutants.

As another example with respect to parameter $P_8$, occupancy sensors are becoming ubiquitous in today's IoT products. A preferred embodiment therefore further includes such an occupancy sensor, or the information thereof, for sophisticated decisions on calculations of the fresh air required by the number of occupants. A preferred embodiment includes, or connects wirelessly with one of the building's already-installed, occupancy sensors, and information about the actual number of occupants in building 19 is provided to the controller 10 programming. The occupants also will have an opportunity to update the nominal number of occupants who regularly and permanently occupy that space, through buttons/display 202/204 or some other interface (again, potentially remote, through an app on a smartphone, tablet, or the like). Preferably, the user is periodically requested to indicate to controller 10 the number of permanent full time occupants in building 19, and thereafter the actual real time number of occupants as detected is compared to the user-input permanent number, so as to evaluate ventilation needs in opportunities relative to the comparison.

Given the preceding bases of comparison, upon capturing when there are people in and not in building 19 (occupied or not), the preferred embodiment programming is operable to capture periods of time (and percentages of time) when the space is not occupied and incorporate that into a calculation as to whether sufficient air ventilation has been provided, given the needs of human occupants, which is the issue that drives the need and standards for ventilation in the first place. Thus, the preferred embodiment algorithm may then use the percentage of occupied to non-occupied time and incorporate that into the fresh air formula for calculation for that space. In contrast, at present, the standard calculation assumes 100% occupancy and therefore calls for a CFM of ventilation expecting such 100% occupancy; with the preferred embodiment ability to monitor actual occupancy, however, it may be observed, and potentially added to the standard, that CFM requirements may be reduced due to periods of lower than 100% occupancy. Indeed, in general all spaces will have less than 100% occupancy over time, and the preferred embodiment therefore allows for a reduction of the required amount of fresh air for healthy indoor air.

Generally, the calculation will notice periods of unoccupied time and deduct that time from the formula for fresh air requirements for the space allowing the system to show better performance against the requirements. As another example, if real time occupancy of building 19 is high (i.e., as indicated by parameter $P_8$), then a relatively higher speed of $S_N$ or a speed toward $S_N$ may be asserted, so as to provide more a corresponding increase in exterior air CFM to offset the effects of the relatively large building occupancy.

The preferred embodiment occupancy processing further allows for adjustments during commissioning. Specifically, upon detecting changes in the number of occupants of building 19, then a preferred embodiment algorithm is able to adjust the formula for the space based on the original number of occupants input on commissioning. The commissioning occupants are based (usually) on the formula and are calculated by the number of bedrooms plus one. The change in actual expected permanent occupants (fewer or more) will impact the fresh air requirements for the space involved. The algorithm will then use the new actual number of occupants in the space and incorporate that into a fresh air formula for calculation of a fresh air requirement for that space. In many cases, occupants will use bedrooms as offices and many will have fewer occupants than the formula projects. Many cases will also show changes over time as families grow and shrink in size. In this case, the fresh air supply will appropriately grow and/or shrink with the number of permanent occupants in the space. This also holds true for rental properties where, for example, a two-bedroom apartment for one rental period might hold one or two occupants and in another rental period the same space might hold three or more occupants. Again, the flexibility of this control device for adjusting the fresh air to the current actual number of permanent occupants in the actual space is useful.

There are particular use cases where occupancy has unique applications. Hospitality is one example of such unusual use case. Thus, in a preferred embodiment directed to hospitality applications, controller 10 will interact with the occupancy information to understand level of occupancy of the specific building and a specific room. Unless modified by a commissioning authority, the requirements of the fresh air standard will over ventilate the space compared to the fresh air amount of required based on the actual occupancy of a specific space. Average annual occupancy in hotels with Package Terminal Air Units (PTAC's) is more like 55% for all hotels and the major chains range from approximately 50% to 60% average annual occupancy. Any specific room is likely to be unoccupied as much as 40% (and perhaps substantially more) of the days of the year. By capturing actual occupancy and automatically adjusting the fresh air requirements formula for actual days of rented/occupied usage, the required amount of fresh outside air for acceptable indoor air quality might be substantially reduced.

Figure 7:
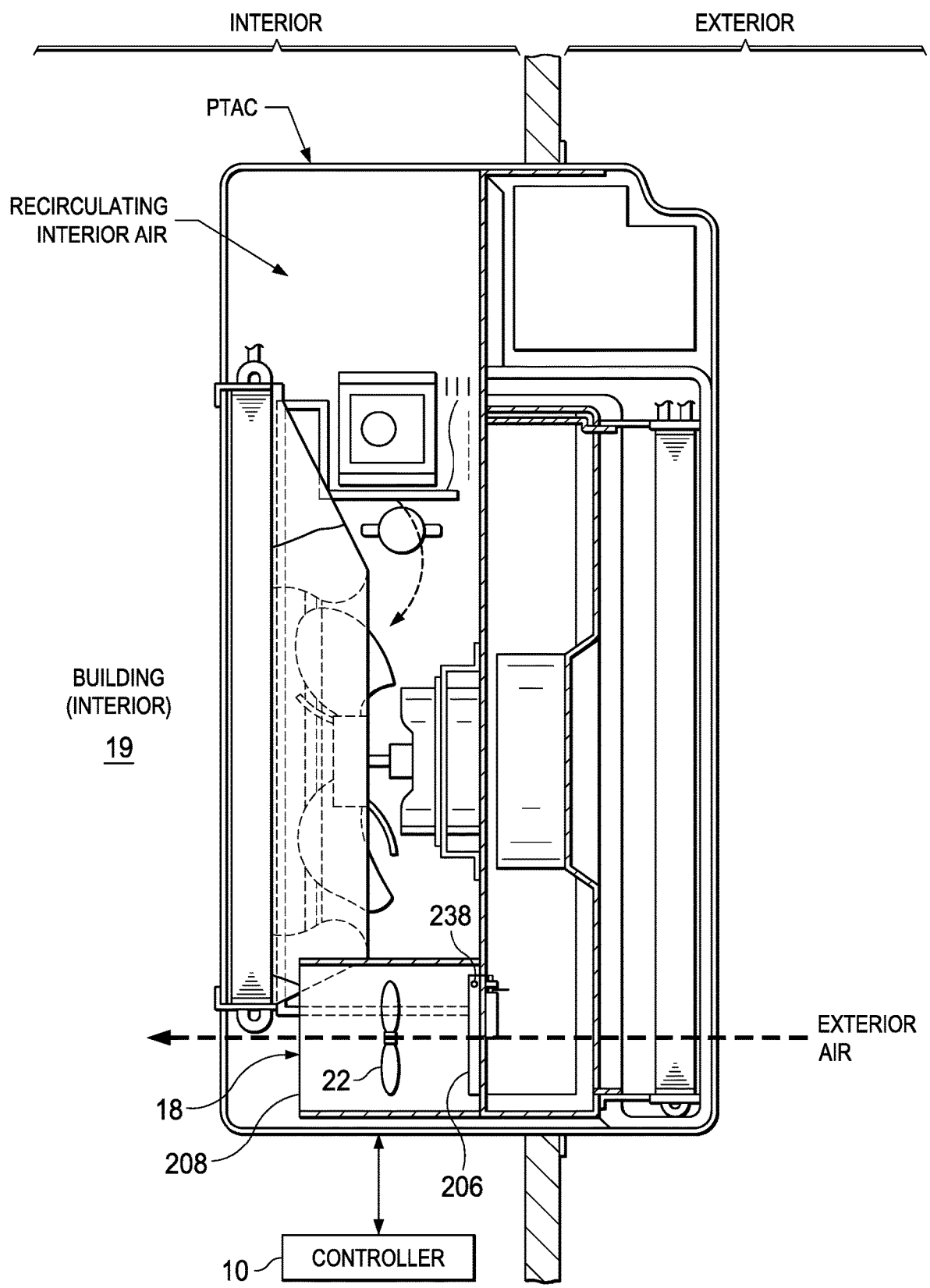
FIG. 7 illustrates a preferred embodiment integration of various aspects integrated into a new or existing PTAC, such as through installation of a kit.

In addition, the very nature of a hospitality/hotel space usage means that it is often occupied for short time periods during the days of rental. Actual time occupied (time spent in the room) as a percentage of the total days rented will be substantially lower than days rented. This number may be as low as 12 hours on average. Assuming 60% occupancy, fully 50% of the 60% incorporates time outside the space where calculating the impact of human impact needing to be mitigated by introducing fresh air. The combination of unrented space with unoccupied space together reduces the need for mechanical fresh air required for acceptable indoor air quality, and the preferred embodiment controller 10 is operable to process such factors and reduce ventilation rate accordingly. The capture of actual occupancy may significantly impact the size of the mechanical ventilation product. In a small hotel (or equal) room, the amount of calculated CFM required is substantially impacted by the volume of air required for human occupancy. When the percent of occupied time in a space declines due to the transient nature and lack of 100% leasing of the hotel room, the amount of required CFM will be reduced. In addition, as some buildings may be "pre cooled" to ensure comfort of the occupants, some buildings/units may be, by implementing teachings herein as a preferred embodiment, comparable "pre-" treated with ventilation, that is, "pre-freshed" or pre-ventilated, prior to occupancy. In the hospitality use case, there may also be an opportunity to capitalize on the concept of "integrated ventilation" as proposed by Walker, Sherman and Dickerhoff. FIG. 7 illustrates a preferred embodiment that integrates this embodiment into a new or existing PTAC through installation of a kit, whereby a unit 18 is added into the interior of the PTAC, under control of a controller 10, and potentially in combination with a modulating damper 238 that also would be controlled to open or close (partially or fully) under control of controller 238. Specifically, in the prior art, typically a PTAC includes within its outer housing a controllable damper that is set to a position during installation (or maintenance) and thereafter retains that initial position. In contrast, by implementing unit 18 in connection with a PTAC as shown in FIG. 7, controller 10 operates fan 22 and opens or closes modulating damper 238, to open partially or fully so as to allow the introduction of the exterior air, based on parameters as detailed previously. Thus, when ventilation is desired, controller 10 opens damper 238 is open so as to draw exterior air into the interior, and when ventilation is not desired, controller 10 closes damper 238, yet the larger fan apparatus already a part of the PTC may then recirculate the interior air.

Figure 8:
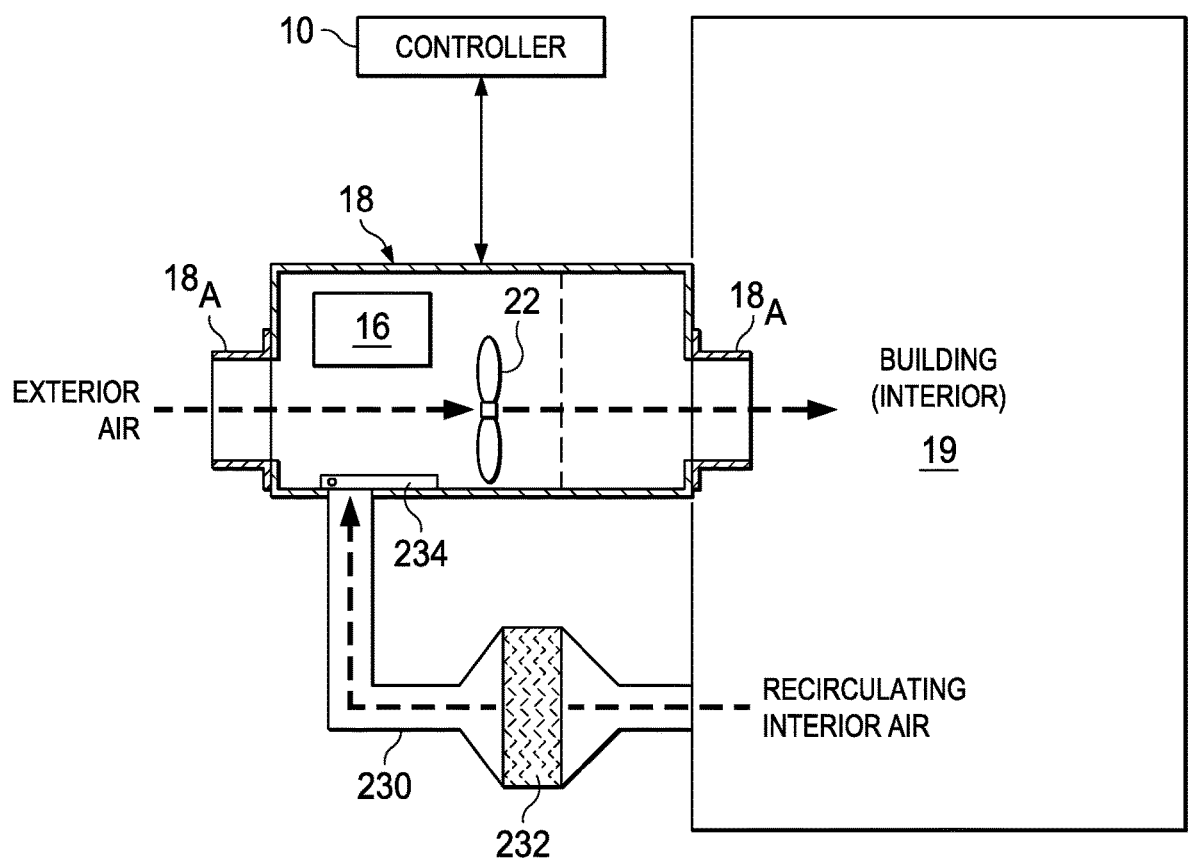
FIG. 8 illustrates controller 10, duct 18, and building 19, along with a recirculation function.

As another example with respect to parameter $P_9$, if the particulate count is above a certain limit for an occupant, that limit may be input to CSCM 12 or the other programmable portion of controller 10. In the preferred embodiment illustrated in FIG. 8 controller 10, in addition to its other functions as described above, is operable to recirculate interior air (through a high MERV Filtration device 232) when it is not preferable to introduce outside air to the building interior 19, such as at times of high temperature or humidity. In this regard, FIG. 8 illustrates an additional recirculation conduit 230 to FIG. 6, which may be implemented as a separate duct, ducts, or structure outside of the interior of duct 18 (or as part of it, particularly if duct 18 is implemented as a larger volumetric enclosure). Conduit 230 provides an airflow path from the building interior 19 back to duct 18, with the recirculating interior air preferably passing through an air cleaning device such as, but not limited, to an ionizing air purification system, HEPA filter, or MERV 13 or greater filtration filter 232. The recirculating interior air enters duct 18 through a modulating damper 234, so named as it is mechanically or electromechanically, such as in response to control from controller 10, operable to open partially or fully so as to allow the introduction of the interior air, and when fully open to block the introduction of exterior air so that only interior air is recirculated through duct 18 and into the building interior 19, as further detailed later. Once the recirculating interior air passes through damper 234, it then is reintroduced into the building interior 19. Note, therefore, that for the FIG. 8 preferred embodiment, when an exterior condition (e.g., particulate count) is beyond the acceptable range, rather than adjusting the speed $S_x$ of fan 22, as an alternative or in addition to such an adjustment, controller 10 controls damper 234 to close while controller 10 still controls fan 22 to operate at a speed greater than zero, but the air flow thereby moved by fan 22 is in connection with recirculating interior air, rather than ventilating in exterior air.

In all events, the programmable aspect of controller 10 is further such that any combination of the input parameters is evaluated so as to control the speed of fan 22 in accordance with the range/limits established and the real time value of the parameter(s) for which a range, limit, or timing is established. Thus, in the above-incorporated U.S. patent application Ser. No. 14/426,733, fan 22 is either on at a nominal or standard speed, off, or in a Custom mode may switch between the nominal speed and a slower exterior air sampling speed. In the present preferred embodiments, however, the CSCM 12 and/or controller 10 may be expanded to contemplate more parameters and also to communicate and thereby cause the fan 22 operate at three or more different speeds up to N different successively higher speeds and potentially starting from a speed of zero. Given the preceding, in addition to providing a low-speed/low CFM sampling period, there is the further benefit that once sampling finds desirable exterior air (according to the parameter(s) considered), a fan speed to achieve CFM equal to or even exceeding the standard may be applied to fan 22. Thus, in addition to being able to automatically downshift to a low (or lowest non-zero) fan speed possible for sampling, when conditions improve, the system will know (through the sampling process every 15 minutes and/or through external sensors or data) and will automatically increase the fan speed to a higher speed/CFM, such as the standard CFM or even higher. Thus, when conditions are optimal, the automatic fan change method will then move to a maximum CFM and over ventilate the space as much as possible.

Also in a preferred embodiment, controller 10 may select and effect a speed $S_x$ of fan 22 based on how close a parameter is relative to the desired limit. For example, when the outdoor air is within the limits set for temperature or humidity yet still within a near boundary (e.g., within five percent) of those limits, controller 10 selects a first speed to operate fan 22 at the CFM set by the commissioning technician. Also in this regard, note that since controller 10 is operable to detect CFM, if the established speed S, does not achieve the expected corresponding CFM, then the fan speed can be increased until that CFM is reached—thus, the preferred embodiment is in effect setting either or both of fan speed and a target CFM, in that controller 10 is operable, through the use an incorporated air flow measure (e.g., hot wire; differential pressure, etc.), to verify that the latter target (CFM) is achieved by the enabled speed. However, when the air improves such that it is further from that boundary, for example when either (or both) temperature or humidity is within and more than five percent from one or the other boundary in a set range, controller 10 selects and directs a faster speed (and corresponding increased CFM) to operate fan 22, at a speed therefore greater than the CFM set by the commissioning technician. Indeed, controller 10 may identify additional levels of comfort as the actual parameter is farther within the limit, with increasing amounts of CFM and therefore increasing amounts of over ventilation, up to the maximum amount possible. This embodiment envisions the use of algorithms that incorporate ASHRAE Standard 55 (Thermal Comfort) and Psychometrics to determine what "ideal conditions" would be. Ideal conditions defined as the best combinations of acceptable outdoor air temperature (ODT) and outdoor air humidity (ODH) for determination of when to ventilate to standard, when to ventilate to maximum air speed and when to recirculate indoor air.

Figure 10:
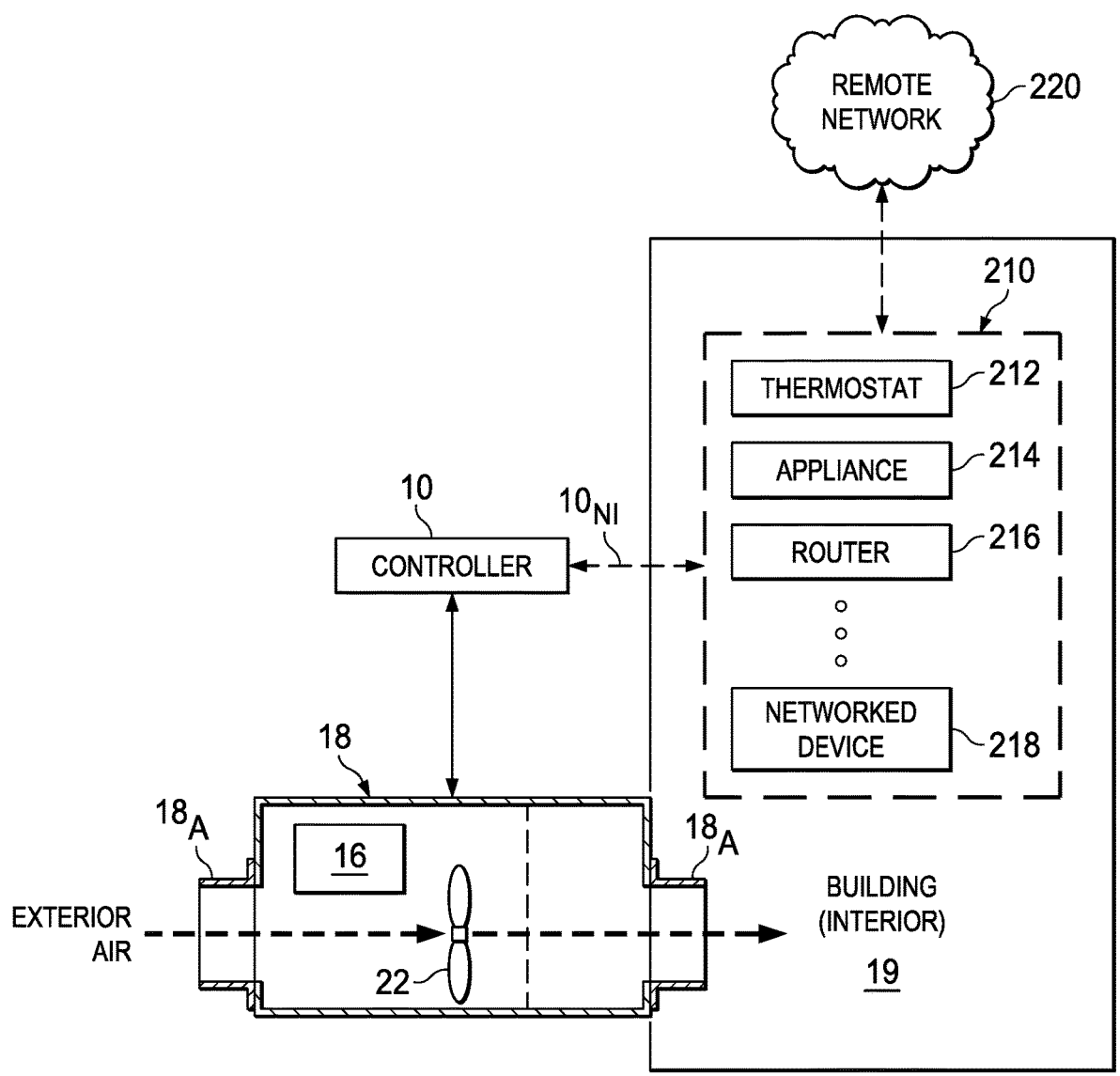
FIG. 10 illustrates controller 10, duct 18, and building 19, along with networking devices and aspects of a preferred embodiment.

Lastly, note that in addition to the data of the parameters, portions of the analyzing or controlling software also may be stored in another device that communicates with controller 10, such as in a separate control device (e.g., thermostat), the Internet, or on other IoT devices within building 19, as further shown later by way of example in FIG. 10.

Referring back to FIG. 3B, now in combination with the teachings of FIG. 8, note also therefore that a preferred embodiment permits both automatically changing fan speed based on one or more parameters and also CFM through duct 18 (and also possible reporting the actual fan speed). Reporting CFM through duct 18 is an extremely useful and time saving step for commissioning the system. Moreover, at present with the laborious testing steps required, the commissioning technician or the energy rater only learns of CFM at the time instant when the testing is occurring. In the preferred embodiments, the system may run through various different parameter combinations to inform the technician of the various different CFM levels (and fan speeds) attainable, and thereby also reveal that in one or many sets of circumstances, the ASHRAE standard is met or exceeded. Also, the system can confirm its maximum speed $S_N$, which if achievable is intended to sufficiently exceed the standard, thereby offering the commissioning technician or other tester sufficient confidence of standard compliance.

Figure 9A:
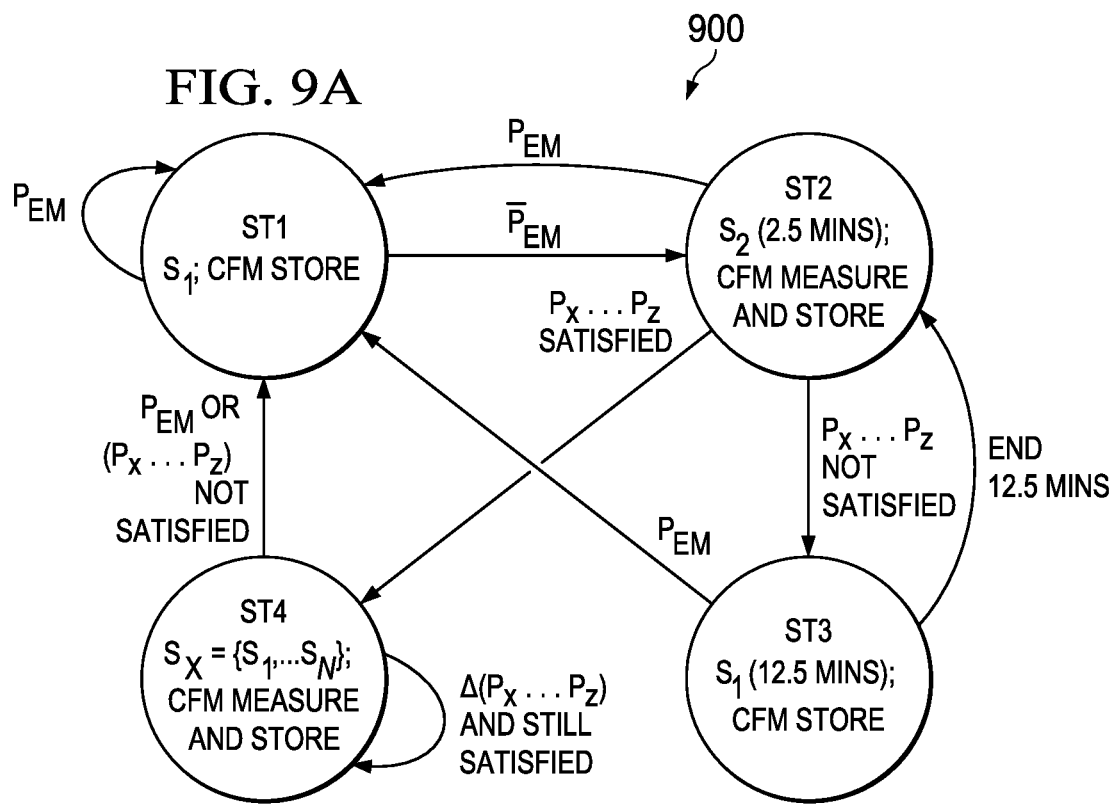
FIG. 9A illustrates a state diagram of a preferred embodiment method 900 of operation of duct 18 under control of controller 10.

With a preferred embodiment including plural non-zero speeds of operation of fan 22 in response to various parameters, and further in view of the operability to measure internal air flow through duct 18, numerous other preferred embodiment aspects are achievable as are resulting benefits and potential for industry and standardization improvements, as are now introduced with the state diagram of FIG. 9A. As is known in certain arts, a state diagram is a general representation of circuitry, and potentially related functionality, as transitions occur from one operational state (represented by a circle) to another operational state (represented by a different circle). Moreover, as is the case in FIG. 9A, transitions may occur based on various conditions, and among different states. Thus, FIG. 9A illustrates a preferred embodiment method 900 of operation of duct 18 under control of controller 10, that in some parts should be understood from earlier discussion. Also by way of introduction, method 900 includes four states that may be established by or in connection with controller 10, designated ST1 through ST4, each reachable based on various conditions, as further discussed below.

For sake of explanation, consider method 900 commencing with state ST1, as may occur, for example, upon start-up or reset of controller 10. In state ST1, controller 10 controls fan 22 to operate at the lowest speed $S_1$ which, in a preferred embodiment, is a speed of zero (i.e., fan 22 is disabled). Also during state ST1, the air flow (CFM) sensor (e.g., FIGS. 4 and 5) senses air flow and controller 10 thusly receives that sensing signal(s) so as to measure air flow, and controller 10 stores that value, again either in local or remote memory (or both). Note a transition from state ST1 occurs in response to what is referred to herein as an emergency parameter $P_{EM}$, in that the preferred embodiment contemplates that some parameters from Table 1 (or otherwise), including or apart from those detected by air sampling through duct 18, may represent a sufficiently hazardous condition from which it is beneficial to immediately halt fan 22, without waiting for a sample period. For example, a smoke sensor that is either onboard controller 10, or that communicates to controller 10, could detect external smoke at a level that warrants immediately stopping any ventilation; one skilled in the art will appreciate other such parameters in Table 1. Thus, toward this end, if such a parameter $P_{EM}$ is asserted, then method 900 remains in state ST1, so that fan 22 is maintained at zero speed (i.e., $S_1$) in which case the emergency condition prevents unsafe exterior air from being ventilated through duct 18 into the interior of building 19. When and if the emergency parameter $P_{EM}$ is no longer asserted (shown in FIG. 9A by the over score convention of $\overline{P}_{EM}$), then method 900 transitions from state ST1 to state ST2. Moreover, note further that any state within method 900, if the emergency parameter $P_{EM}$ is asserted, transitions back to state ST1, during which again controller 10 disables the fan 22 speed (i.e., speed of zero) in response to the asserted emergency parameter $P_{EM}$.

In state ST2, controller 10 operates fan 22 to sample exterior air through duct 18 at a sampling speed. For sake of reference and using the earlier convention, assuming that a fan speed of zero is indicated as $S_1$, so the next greater speed, while still relatively slow as compared to nominal or above-standard speed(s), is speed $S_2$. Thus, state ST2 is shown to control fan 22 to operate at speed $S_2$. Moreover, the speed $S_2$ is maintained for a low-speed sampling period (e.g., 2.5 minutes). During this time, therefore, some amount of ventilation occurs, from exterior into the interior of building 19. Also during this period, any sensor(s) associated with the sampled air is able to measure the respective parameter (e.g., temperature, humidity, other) associated with this air. Moreover, again an air flow measure is taken and stored during state ST2. Assuming no emergency parameter $P_{EM}$ is asserted during state S2, then the relatively low-speed air sampling permits controller 10 to determine if the parameters being sensed (shown in FIG. 9A as $P_x \ldots P_y$) are not satisfied, in which case method 900 transitions from state ST2 to state ST3, or alternatively controller 10 determines that the parameters being sensed are satisfied, in which case method 900 transitions from state ST2 to state ST4. Each of these alternatives is discussed separately, below.

In state ST3, having been reached following the low-speed sampling of state ST2 and given the condition that the parameters were not satisfied, controller 10 disables fan 22, that is directs it to stop, as indicated again by a fan speed of $S_1$ (i.e., speed equal to zero). Thus, states ST2 and ST3 combine to achieve the earlier-described repeated sampling period of controller 10/duct 18, which was provided as an example of sampling 2.5 minutes every 15 minutes. Particularly, because the 2.5 minutes of sampling occurred in the preceding state ST2, then state ST3 awaits (approximately) the remaining 12.5 minutes of the total 15-minute period. Moreover, the zero CFM, because fan 22 is disabled, is also stored during state ST3. Once the 12.5 minute period of state ST3 ends, and if no emergency parameter has been asserted during that time, method 900 transitions from state ST3 to state ST2, to repeat another 2.5 minute low-speed sampling period. Thus, so long as the parameters remain unsatisfied, note that the toggling between states ST2 and ST3 will repeat, thereby causing the low-speed sampling for 2.5 minutes (or some other period, such as 5 minutes) every 15 minutes, thereby allowing periodic re-sampling of exterior air, while also beneficially providing at least some ventilation every 15 minute period. Also in this return transition from state ST3 to state ST2, eventually it is expected that the parameters will be satisfied and thereby detected as such in state ST2, and in response method 900 transitions to state ST4.

In state ST4, when reached following the low-speed sampling of state ST2 and given the condition that the parameters were satisfied, controller 10 controls fan 22 to operate at a speed $S_x$ in response to the parameter(s) sensed in state ST2. For example, if the sensed parameters demonstrate ideal conditions, then speed $S_x$ may be the speed referred to above as speed $S_N$, meaning the highest achievable speed of fan 22, thereby exceeding the standard speed which sets a nominal value in expectation of continuous ventilating at a single speed. As another example, if conditions are such that a parameter is within but near a boundary endpoint (e.g., within five percent thereof), then speed S, may be closer to, or even below, the nominal standard speed which sets a nominal value in expectation of continuous ventilating at a single speed. Others examples will be understood to one skilled in the art given the teachings of this document. Moreover, again an air flow measure is taken and stored during state ST4. Note that during state ST4, as air is flowing from the speed S, the sensors associated with duct 18 as well as any external sensors continue to sense the respective parameters associated with those sensors. Thus, once method 900 reaches state ST4, a transition may occur if there is a change in a sensed parameter(s). In one possibility, the parameter change may be such that the parameters are still nonetheless satisfied, either fully or near a range of the parameter(s). Thus, FIG. 9A illustrates a return transition, or effectively the function of remaining in state ST4, if such a change (shown as $\Delta(P_x \ldots P_z)$) occurs. For example, suppose that parameters are ideal and controller 10 is operating fan 22 at speed $S_N$, but one of the parameters (e.g., temperature) being sensed changes such that it is less than five percent from the boundary for that parameter; in this case, method 900 remains in state ST4, but the indicated return transition to state ST4 causes controller 10 to establish a new speed, for example less than $S_N$ while greater than $S_1$, so as to reduce ventilation air flow but still maintain it greater than zero, due to the sensed near-boundary parameter condition. As another alternative during state ST4, the parameter change may be an asserted emergency parameter $P_{EM}$ or a large enough change in one or more parameters so that a boundary is no longer satisfied; in this case, method 900 transitions from state ST4 back to state ST1, returning therefore to the above-introduced start/reset state in which case controller 10 disables fan 22, to a speed $S_1$ of zero. Moreover, having again reached state ST1, one skilled in the art will appreciate from the earlier teachings the operation and possible transitions from that point forward.

Figure 9B:
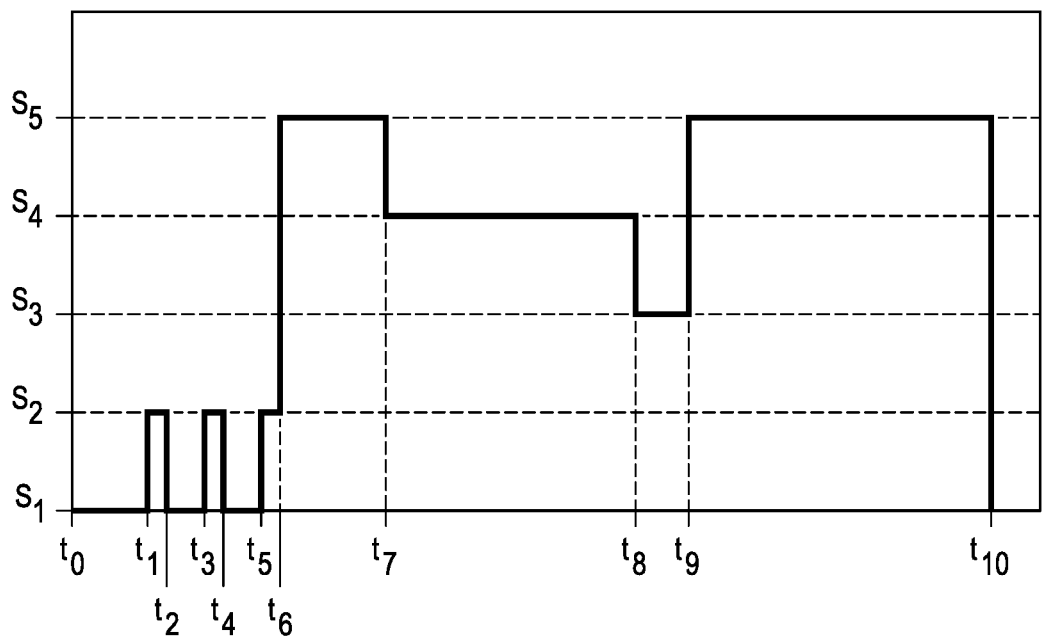
FIG. 9B illustrates a timing diagram of CFM measures/fan speeds arising from examples of transitions in the state diagram of FIG. 9A, where such diagram also may be displayed per a preferred embodiment.

FIG. 9B illustrates a timing diagram of fan speed/CFM over time, by way of an example of the stored CFM data arising from method 900 of FIG. 9A. Thus, the horizontal axis of FIG. 9B represents time, while the vertical axis represents both speed and CFM. Note with respect to the vertical axis it is assumed in the illustration that CFM is directly proportional to speed; however, as indicated in this document, it is also contemplated that various conditions (e.g., debris, clogging, loading from ductwork or other installation issues, degradation over time, and the like) may be such that at a given fan speed, the actual CFM accomplished may differ from that expected or designed for each respective fan speed, and indeed the preferred embodiments include air flow measures and storing steps as detailed herein so as to possibly respond to changes in CFM or evident incongruities between an expected fan speed and a different CFM; however, for the sake of simplicity, FIG. 9B assumes a direct proportionality of fan speed to air flow in CFM.

Time $t_0$ in FIG. 9B is an example reference for state ST1, where controller 10 disables fan 22 to speed $S_1=0$. Thus, between times $t_0$ and $t_1$, no CFM flows through duct 18. Time $t_1$ represents a transition from state ST1 to state ST2, and in the latter, controller 10 operates fan 22 at speed $S_2$ for a period of 2.5 minutes, shown therefore between $t_1$ and $t_2$. FIG. 9B assumes that as of time $t_2$, at least one parameter remains unsatisfied (e.g., beyond a boundary), so method 900 returns to state ST1 and therefore as of time $t_2$ again controller 10 disables fan 22 to speed $S_1=0$ for 12.5 minutes until time $t_3$. At time $t_3$, again state ST2 occurs, causing a 2.5 minute sampling period until time $t_4$, which represents yet again another instance of an unsatisfied parameter, resulting in an off period from time $t_4$ to time $t_5$.

At time $t_5$, again the 2.5 minute sampling starts in state ST1, but at the end of that period, the parameters are sensed to be satisfied and ideal, so a transition occurs from state ST2 to state ST4. In the latter state, controller 10 operates fan 22 at the highest speed, shown in FIG. 9B as $S_5$. As of time $t_7$, state ST4 detects a change in the parameters that, while still satisfied, has at least one parameter nearing a boundary—thus, at time $t_7$, in a return to state ST4, controller 10 adjusts the speed of fan 22 downward to a speed of $S_4$. This condition remains until time $t_8$, at which time ST4 again detects a change in the parameters that, again while still satisfied, has at another parameter nearing a boundary—thus, at time $t_7$, in a return to state ST4, controller 10 adjusts the speed of fan 22 downward to a speed of $S_3$. This condition remains until time $t_9$, at which time ST4 again detects a change in the parameters that, again while still satisfied, has an improvement in the parameters, so that, at time $t_9$, in a return to state ST4, controller 10 adjusts the speed of fan 22 upward to a speed of $S_4$. Lastly, at a time $t_{10}$, an emergency parameter PEM is asserted, and method 900 transitions from state S4 to state S1, at which point controller 10 disables fan 22.

From the above, FIG. 9B provides a time representation of different states of controller 10 and the resultant differing CFM flow through duct 18. Moreover, while only a relatively short time period is shown, note that data may be stored for far greater periods of time, for example up to a year (or beyond). In any event, therefore, FIG. 9B represents an accumulated history of CFM through duct 18, again assuming that CFM is directly proportional to fan speed. However, recall that each state in method 900 also preferably stores the CFM of the state (for states ST1 and ST3, CFM is known to be zero, whereas for states ST2 and ST4, CFM is measured and stored). Thus, FIG. 9B also readily depicts a preferred embodiment aggregating of data by controller 10 and for presentation on a graphical interface for display 202 or to be determined and/or communicated to or by a remote device and display. In this way, a viewer of the display may monitor or perceive air flow through unit 18 over time, again toward the ends and goals mentioned in this document.

FIG. 10 again illustrates controller 10, duct 18, and building 19, along with further aspects of a preferred embodiment. Particularly, controller 10, which may be located in or attached to unit 18, as part of either the interior or exterior of building 19, also may include a networking interface $10_{NT}$, through hardware and software (including a protocol), so as to communicate with a network 210 associated with (typically at least inside) building 19. By way of example in FIG. 10, therefore, network 210 includes one or more devices coupled to each other via a communication link, where in FIG. 10 network 210 includes a thermostat 212, an appliance 214, a router 216, and any other networked device 218 including hardware for network and protocol communications, including a subscriber identity module (SIM) or other comparable device/address (e.g., MAC address/serial number) identifying indication or circuit—such devices are well-known in the art and are further being developed now in connection with increasing networked devices in buildings, including IoT devices. In any event, network 210 may then communicate with a remote network 220, so that data is communicated between building 19 and that remote network 220. Remote network 220 may represent the Internet or any informational conduit to or through the Internet, whereby data may be stored and analyzed remote from building 19.

Further in view of FIG. 10, and recalling that the preferred embodiment controller 10 is operable to real time capture the CFM as well as input parameters (e.g., see Table 1), then an additional preferred embodiment aspect is that such information is communicated to remote network 220 where it may be stored and either real time or later processed— hence, a history database in created that identifies duct 18 (e.g., model number, capacity), informs of the times of operation of duct 18, its speed/CFM, and the attendant parameters during those times. A certain amount of the history may be may kept on the circuit board of controller 10, while other of the history, and likely considerably larger amounts, will be kept in remote network 220 (e.g., the cloud, some distant database, Internet, or the like). Moreover, given such information, a sum of CFM achieved over different periods of time will be readily ascertainable, including from the time duct 18 was commissioned.

Further to the preceding, FIGS. 11A through 11F illustrates various preferred embodiment examples of how accumulated data from controller 10, either stored and processed by controller 10 or remotely, may be displayed, again either via display 202 or remotely, including on an app on a smartphone, tablet, laptop, or in the case of a remote location, at a terminal, workstation, etc. Indeed, for remote stored or processed data, note further that a home owner/occupant may have access to an app or web interface which accumulates CFM/parameter/compliance information and when the user accesses the app or interface, is able to examine depictions such information, such as in FIGS. 11A through 11F.

In FIG. 11A, by way of example, a horizontal bar graph is generated and displayed and that depicts, for a given amount of time (e.g., seven days), three different bars, as may be identified by a legend, color coding, or some other manner to indicate the intended information conveyed by each respective bar in the graph. In FIG. 11A, the top bar illustrates the amount of exterior air (e.g., in cubic feet) ventilated in the building area 19 over the given amount of time, when the user-indicated (or other) parameters are met. Further in FIG. 11A, the middle bar illustrates the amount of exterior air ventilated in the building area 19 over the given amount of time when unit 18 is sampling (see, e.g., FIG. 9, step 902, and note therefore that CFM also may be measured and recorded during that step, or it may be derived, potentially with less accuracy, from speed $S_2$ and the time (e.g., 2.5 minutes) at which fan 22 runs during sampling). Lastly in FIG. 11A, the bottom bar illustrates the amount of exterior air avoided by disabling ventilation into the building area 19, over the given amount of time, when at least one of the user-indicated (or other) parameters is not met; note for sake of example, such "avoided" ventilation is demonstrated by illustrating the bar extending in a direction (e.g., left) that is opposite the positive ventilation measures shown by the top and middle bar, in which latter instances air is ventilated into the building interior 19.

FIGS. 11B, 11C, and 11D are comparable to FIG. 11A, but each indicates a different respective time period over which the three bars indicate ventilation or ventilation avoided. Thus, FIG. 11B corresponds to a time period of 30 days, FIG. 11C corresponds to a time period of 7 days, and FIG. 11D corresponds to a time period of 24 hours (i.e., one day). With such depictions, therefore, an occupant or other person with access may readily appreciate and understand typical usage, influence of parameters, compliance, operability, and the like.

Figure 11E:
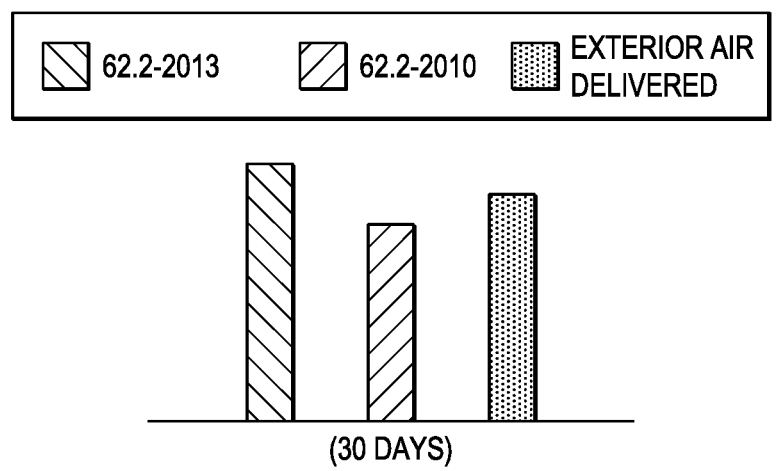

In FIG. 11E, by way of example, a vertical bar graph is generated and displayed and that depicts, for a given amount of time (e.g., 365 days, that is, one year), the amount of CFM required by to be delivered by one or more standards. In FIG. 11E, the left and middle bar, therefore, illustrate the CFM required for the given user (based on the standard's rules, including building size and expected occupancy), based on the ASHRAE 62.2-2013 and 62.2-2010 standards. Also in FIG. 11E, the far right bar illustrates the user's actual CFM, as will have been reported periodically in method 900 (see, step 906). Thus, with an appropriate legend, which may include color coding, the user may readily determine how the ventilated air over the illustrated period of time (again, 365 days for the example shown) compares as against the standard. In the example of FIG. 11E, therefore, the graph depicts over-compliance, over 30 days, with 62.2-2010 and under-compliance with 62.2-2013. And, the user may be an occupant of the building or a person associated with another need to evaluate such information, such as compliance, evaluating and adjusting standards, and the like.

Figure 11F:
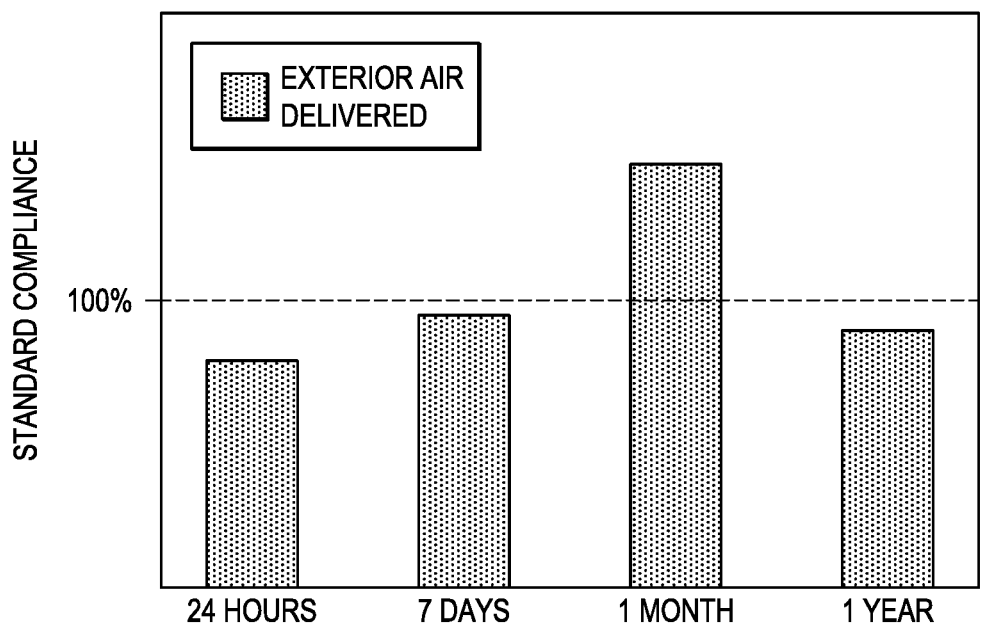

In FIG. 11F, by way of example, a vertical bar graph is generated and displayed and that depicts, for different respective periods of time how accumulated ventilated air (i.e., combining ventilation from both satisfaction of parameters or periodic sampling) compares to compliance with a standard. In the example of FIG. 11F, therefore, the graph depicts under-compliance within the last 24 hours, the last 7 days, and the last year, and over-compliance over the last month.

Given the preceding, the preferred embodiment ability to measure/capture CFM through duct 18 offers a quick ability to capitalize on the value of minimum and maximum fresh air calculations in a product where commissioning is important and where there is significant value in automatically changing the fan speed (min/max, or low speed, standard speed and maximum speed as examples). A key effort of the embodiment is the ability to understand ambient temperature, humidity (and/or dew point, grains of water, or other), and other parameters, and be able to automate the changing of fan speed and resultant CFM based on various and potentially essential requirements.

The ability to capture ventilation parameters and performance remotely also gives rise to a preferred embodiment aspect of re-evaluating a standard in view of more real-life operation of a ventilation system, particularly based on different geographical climates and local environmental factors. Such a preferred embodiment method allows researchers (and marketers) to select any time period to report from the initial time the fan runs to the time periods of 1 day, 2 days, 3 days, 4 days . . . up to any number of days (e.g., one year and beyond) and to evaluate CFM and the influential parameters during that time, with a view toward re-shaping the standard to a realistically attainable goal while still advancing the interest of improving and increasing periods of ventilation. At present, the current state of ASHRAE 62 limits performance by requiring delivery within a 24-hour time period. The natural outcome of that restriction is to push air into home that is unsuitable (extremes of temperature or humidity) and way too often creates a situation where the ventilated air becomes an irritant to the occupant and the solution to the irritation is to shut off the system. In contrast, by collecting information as described above, such information may be offered to the standards organizations to establish patterns based on real human activity over periods greater than the current rigid 24-hour period. The preferred embodiments therefore facilitate and can implement a new form of compliance (with a possible attendant change to the standard), whereby an amount of ventilated CFM over a period of time greater than 24 hours will be demonstrated to be a viably acceptable ventilation approach, particularly in climates where a fixed 24-hour period is not realistically attainable, given consumer inclination to disable the system rather than endure unsatisfactory conditions within a 24-hour period. In effect, therefore, a preferred embodiment methodology will allow a consumer a credit (e.g., a "Fresh Air Credit") for CFM achieved over a time period greater than 24 hours, effectively "banking" the overage, whereby CFM achieved at any time during the longer period is measured against a standard greater than 24 hours. For example, in a humid climate, the consumer may ventilate a relatively larger amount of CFM during a particularly dry week, whereby in a subsequent damp week the CFM may be reduced, with the total CFM over the two week period then evaluated to determine if it meets or exceeds a number deemed adequate for the two week period, rather than rigidly finding compliance during each 24 hour period during the relatively dry week followed by a lack of compliance during each 24 hour period during the damp week.

Note the value of the above functionality is not to be underestimated, particularly given the lack of ability now and the general perception in the industry and to consumers. To the majority of home builders and apartment developers who have not had building science training, mechanical ventilation is a "code driven builder evil." And even for those who understand the importance of whole house fresh air, as building envelopes tighten, ventilation adds cost, complexity and delivers unintended negative consequences. One of the very significant constraints is the belief that the fresh air standard must be met in a 24-hour time period. All the formulas for calculation are based on delivering an appropriate amount of fresh air within 24 hours. The above-noted *Development of a Residential Integrated Ventilation Controller* describes the concept of time shifting with regard to mechanical ventilation, indicating that by moving mechanical ventilation from the hottest and coldest four hours of the day and increasing the required single speed of the selected fan by about 25% so that it delivers more air during the rest of the day than is required by a nominal standard that contemplates continuous 24 hour ventilation, a home could comply with ASHRAE Standard 62. This is a beneficial concept, but it has limitations because it only accounts for temperature and not for humidity. There are many markets (Hot/Humid: Miami, New Orleans and Houston . . . etc. and Cold/Dry: Buffalo N.Y., Missoula Mont.) where a 24-hour time shift is simply insufficient to deliver "acceptable" air to the occupants of a space, and wherein "acceptable" is defined by each occupant of the space and essentially; not too hot or cold and not too humid or dry. The preferred embodiments, however, overcome these insufficiencies.

In another preferred embodiment aspect, the ability to capture ventilation parameters and performance remotely also gives rise to a preferred embodiment aspect of comparing performance to multiple different standards. For a number of years, the fresh air standard required by energy code has been the same as the fresh air standard required by above code programs using ASHRAE. But, in the future, that may be true less often. Now that the 2012 IECC and the 2015 IECC require ventilation as a mandatory item, many builders installation of ventilation products may be made to meet the compliance requirements of the base code, while many above code programs may march towards compliance with higher mandatory mechanical ventilation rates required by ASHRAE 62.2-2013 and subsequent versions. When comparing performance to a standard, it is of crucial importance in knowing exactly what standard is being used as the base line. A preferred embodiment methodology will provide the occupants (or others, remotely) with the ability to compare performance to either the code standard or one of the ASHRAE 62 standards. The occupant can select which standard they wish to evaluate for performance and the algorithm can calculate the change of performance to standard based on the new underlying requirement. Such a choice may be implemented also as a "one touch" feature in a button 204 (see FIG. 1), where programming in the system will thusly recalibrate the performance to the requirements based on notification, if the requirements are code, or ASHRAE standards or the requirements are some other standard performance that are measuring fresh air. There are different standards of performance and different formulas. So, calculation how building 19 performs in comparison to the code performance or to the above code performance and showing one versus the other can be a virtue of comparison for those who want to understand and for accurate and useful communication to the occupants of the space being ventilated. For example, the technician commissioning the system might select between the following four different standards (not an exclusive list), in which case the processing circuitry of controller 10 is programmed to change the internal calculation to match each shown below, so that a required CFM is determined for the respective standard, and then the actual CFM of unit 18 may be compared to that required CFM to indicate to the user whether the standard is being met:

i. 62.2-2010 (7.5×# of Bedrooms+7.5)+1×100 sq. ft.=Required CFM (Standard gives equal value to ventilation systems Balanced, Supply Only and Exhaust Only.)

ii. 62.2-2013 (7.5×# of Bedrooms+7.5)+3×100 sq. ft.=Required CFM (Standard gives equal value to ventilation systems Balanced, Supply Only and Exhaust Only.)

iii. 62.2-2016 (7.5×# of Bedrooms+7.5)+3×100 sq. ft.=Required CFM (Standard gives a preferred value to Balanced ventilation systems and will add a penalty to the formula for Supply Only and Exhaust Only ventilation systems.)

iv. IRC 2013 (7.5×# of Bedrooms+7.5)+1×100 sq. ft.=Required CFM (Standard gives equal value to ventilation systems Balanced, Supply Only and Exhaust Only.)

v. Note: other standards for mechanical fresh air may apply. Those standards would include various Title 24 standards among others not mentioned. The preferred embodiment, therefore, provides the ability for users to select the standard that is most appropriate and most useful to the user.

Figure 12:
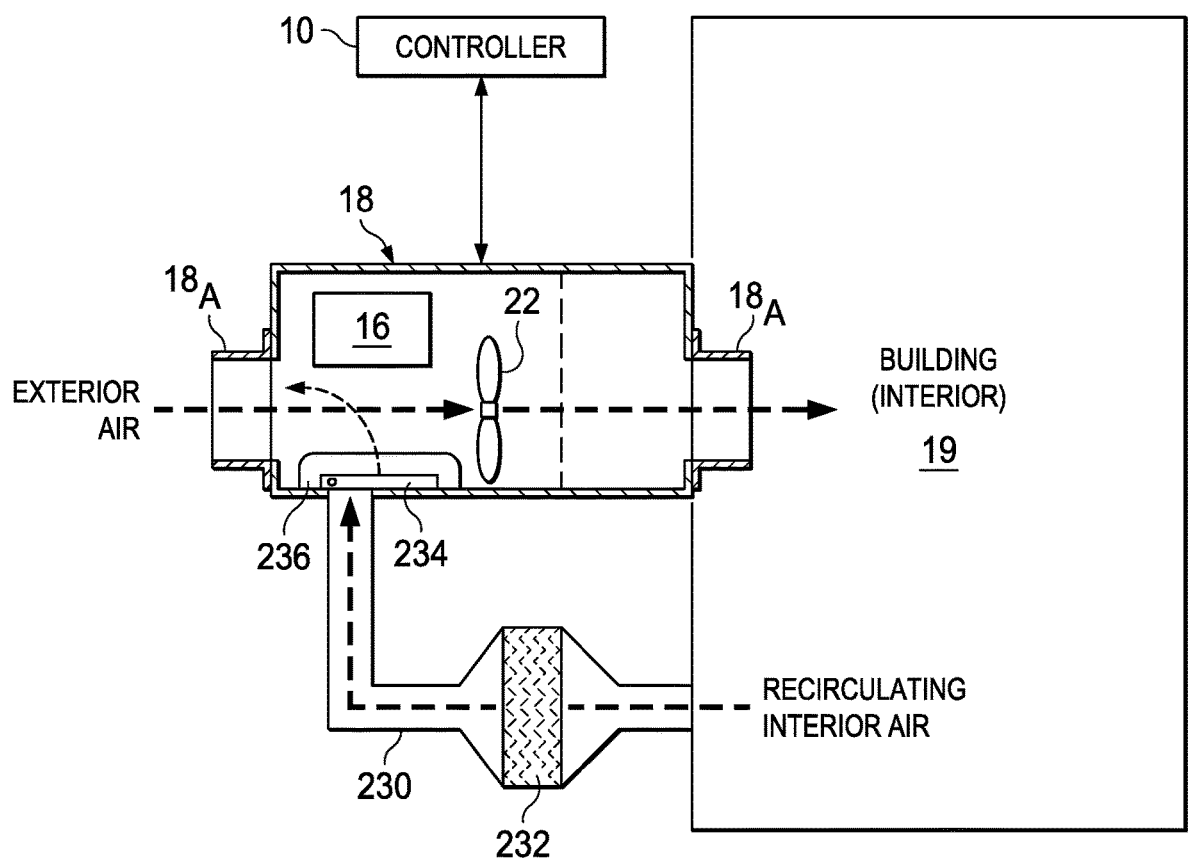
FIG. 12 again illustrates controller 10, duct 18, and building 19, along with further aspects of a preferred embodiment so as to include a dehumidification function.

FIG. 12 again illustrates controller 10, duct 18, and building 19, along with further aspects of a preferred embodiment so as to include a dehumidification function. Particularly, FIG. 12 illustrates a recirculation conduit 230, which may be implemented as a separate duct, ducts, or structure outside of the interior of duct 18 (or as part of it, particularly if duct 18 is implemented as a larger volumetric enclosure). Conduit 230 provides an airflow path from the building interior back to duct 18, with the recirculating interior air preferably passing through an air cleaning device such as, but not limited, to an ionizing air purification system, HEPA filter, or MERV 13 or greater filtration filter 232. The recirculating interior air enters duct 18 through a modulating damper 234, so named as it is mechanically or electromechanically operable to open partially or fully so as to allow the introduction of the interior air, and when fully open to block the introduction of exterior air so that only interior air is recirculated through duct 18 and into the building interior, as further detailed later. Once the recirculating interior air passes through damper 234, it then passes through a dehumidifier 236.

Given the structure of FIG. 12, controller 10, in combination with sensors pertaining to exterior RH, an optionally an additional interior air RH sensor, is operable to open or close damper 234, so that during desirable periods and based on exterior and interior RH, dehumidification of interior air may be enhanced, through the otherwise ventilating apparatus, by continuing to operate fan 22 at greater than a speed of zero with damper 234 closed, thereby recirculating air through recirculation conduit 230. Note that such an approach addresses numerous drawbacks of current air systems. Particularly, humidity in low load homes is a growing problem emerging from more stringent energy codes. With increased efficiency in homes, demand for heating and air conditioning is reduced, so there are longer periods of time during the shoulder seasons of the mild calendar year when there is no call for either heating or cooling. However, just because the outdoor temperature is mild (e.g., during such a shoulder season), does not mean that the humidity is within tolerance. In fact, researchers are finding that there are periods of time with periods of significant outdoor humidity and the high performance home has no way to remove the pervasive humid air that migrates inside. One traditional solution is to add a dehumidifier into the home, and some of those products even have small ventilation ducts that are attached, allowing for dehumidifiers that sometimes ventilate. However, in the price sensitive new construction market, many builders do not install or even offer dehumidifiers because they are not required by code. The preferred embodiments contemplate, however, that ventilation products are now being offered due to code requirements, so this invites the opportunity to further address the separate humidity issues noted above—that is, with ventilation required, augmenting that functionality provides a code compliant device that further provides the growing need for dehumidification. With this addition, a preferred embodiment can reduce manufacturer and buyer cost because a product required by code (mechanical ventilation) can also dehumidify, when needed, without relying on a separate device that may not be separately incentivized for various reasons. Indeed, dehumidification might often be needed in certain hot and humid coastal communities so this variation is an excellent option as an offered upgrade to a homeowner during the sales process. By putting the ventilation controller 10 in charge first, the ventilate first methodology also builds on the methods describe above on when to determine if the modulating damper 234 should be open, partially closed or totally closed allowing only recirculation. When the humidity level inside the home is above levels desired for comfort (the range starts at 50% and goes to 65% in terms of what occupants might define as uncomfortable), controller 10 will receive a signal from the humidity sensor in the home (e.g., at the thermostat or a free standing sensor) or through moving all or a portion of indoor air over the humidity sensor and will partially or totally close damper 234 and recirculate the interior air of building 19 through as many additional passes through dehumidifier 236 as needed to manage the level of humidity in the space. This combination is a very cost effective way to control humidity and ventilation because it utilizes many of the same parts and labor (ducts, fan, controls, outlets) for dual use and only adds the compressor and drain parts of the dehumidifier as additional equipment required to provide the needed dehumidification. The system can also use all the sophistication of the ventilation software that is now available in the single combined duct 18 (with its controller 10), none of which is available or functional in the separate parts. Another key element of this combination is this method will have considerably lower operating cost for HVAC and ventilation in hot and hot and humid areas by ventilating at the best possible value and keeping the space comfortable while operating the lowest cost item to remove humidity. It is a way to achieve both high performance and low cost, which create great competitive value for the marketplace, while also endeavoring to comply with ventilation code requirements. The method integrates the concepts of over-ventilation, over-the-standard credited fresh air, and ventilation first/then dehumidify to have the best performing and lowest first cost and operating cost in high humid areas—delivering both high performance and lower cost. Another preferred embodiment will be offering variations to recirculate the indoor air during times of high humidity and never bring in outside air or bring in low percent of outside air relative to the amount of indoor air that is recirculated. The options for the designer are: (1) turn ventilation to off and bring in zero outside air; (2) recirculate indoor air through an air cleaning device such as a high MERV Filtration device and capture Fresh Air Credit by cleaning the air; or, (3) run the ambient air through a dehumidifier and if internal home humidity increases still, then recirculate air from the home (vastly reducing or eliminating outside humid air through a partially or totally closed damper) and (4) dehumidify and recirculate through a high MERV filtration device. Recirculation through a MERV 13 (or other high MERV equivalent) filter without dehumidification is a method of cleaning the indoor air without the expense of purchasing and operating a dehumidifier.

The FIGS. 8 and 12 recirculating preferred embodiments further invite additional information and revising to current standards. Today, the ASHRAE and Code fresh air formulas assume that outdoor air is better, fresher and cleaner than indoor air and, is therefore an improvement, even though it is known in the art there are many outdoor air pollutants that cause indoor air problems. Humidity may well be the pollutant that causes the biggest barrier to the systematic mechanical fresh air's acceptance in the standard flow of new construction. There are a host of other pollutants that are not yet contemplated in the standard and, prior to certain preferred embodiments, there are not yet systems to capture or controls to take notice of them. The ASHRAE 62 Committee has considered recirculation and filtration (e.g., MERV 13 or greater), but prior to the preferred embodiments there are not known a standard or commercialized method to determine how to decide when to recirculate instead of ventilate. The preferred embodiments, however, provide myriad options. Based on temperature and humidity, and possibly further in view of any of the additional parameters of FIG. 4, the FIGS. 8 and 12 preferred embodiment permits modulating damper 234 to fully open or to partially open, so as to allow for progressive reductions in outdoor air and increases in recirculated air to a complete close of the damper creating a 100% recirculation of interior air. Therefore, a sliding scale is provided of high and low temperature and high and low humidity, where the mixed air temperature and/or mixed air humidity signal the degree of angle on damper 234 determining how much open or closure it would display. The higher the outdoor humidity and the larger the air flow, the more fan 22 will modulate on temperature and humidity to limit the impact of the outdoor conditions on the indoor environment. The objective is to capture as much fresh air dilution as possible, until the impacts of temperature and/or humidity become negative factors to comfort or become an energy penalty negative. During high temperature/RH outdoor air conditions, fan 22 would not allow for additional heat or humidity impacts and in fact would not run at all during high utility load events. Every 15 minutes, the system preferably samples the outdoor air for 2.0 to 5.0 minutes to determine the outdoor air condition and, based on the actual conditions of outside air, returns to recirculation mode or not and the percentage of recirculated air. In the event that controller 10 received all its information from an Internet connection, the unit may or may not be programed to perform actual sampling, as data may be remotely available without the need for sampling at the location of duct 18. This preferred embodiment therefore offers the designer of the system an improved selection of options in the design of the fresh air system so as to maximize the air quality at the lowest operating cost. The preferred embodiments include many ventilation products that capture air quality information from the Internet in the future, so such preferred embodiments will include programming to process what to do with the information and the impact of periodic information from systematic weather information. Other key forms of pollution have other impacts. Pollen data can be interpreted to be an immediate shut off of exterior air, while certain spores are prevalent in quantities depending on the allergic tendencies of occupants in building 19. Periodic haboob events also are preferably 100% on or 100% off events, that is, detecting an occurrence of such an event (e.g., again by localized sensor or from remotely provided data), will cause a response to fully recirculate 100% interior air and to exclude the exterior air, during (and possibly for some time following) the event. Radon readings identified from internal product or sensors internal to the home may call for 100% dilution (i.e., provision only of exterior air) and/or reporting to sources of the presence of this dangerous substance. Each selected substance or parameter may have its own unique operating characteristics defined in terms of choosing exterior air, interior recirculated air, or some fixed or varying percentage combination of the two.

Given the various circuitry and functionality described thus far, a preferred embodiment further includes a method of capturing failure of performance and reporting that failure either locally via display 202, or remotely to a location distant from building 19 given the network connectivity aspects of controller 10. Again given that controller 10 is operable to detect, store, and report the amount of CFM going through duct 18, one or more sensors can also capture when there is power to controller 10, yet unexpectedly low or no air is passing through duct 18 as represented by the low or zero CFM. In such an event, controller 10 detects the failure of performance and reports it to the occupant or (e.g., if programed on installation) to a maintenance department, which could include a local manager of a larger facility, or a monitoring or governing entity. This is crucial performance measure with a product that is, for all practical purposes, transparent to the occupant. If the system is installed so that it cannot be seen, heard or felt (because the incoming air is temperate and not overly humid or dry), then the system could fail and the occupant might never know. The preferred embodiment, therefore, provides additional notice, which may further facilitate a call for service of controller 10 or duct 18. Preferred embodiment notices are:

Fan Not Running
    Call for Service
    Replace Filter
    Potential Clog at Fresh Air Intake One of the very significant problems outlined earlier is that there have been no successful efforts to develop a value proposition for the owners/occupants of the ventilation system once one is installed in a home, apartment or a small commercial building. A preferred embodiment method as detailed earlier offers to provide a performance metric showing on a daily or weekly or annual (or anything in between) basis the fresh air performance to the standard for indoor health for that space. That may we be a first and crucial step in delivering a value proposition. Yet, by itself, it may not be sufficient to create an owner demand for fresh air.

Returning to FIG. 6, recall that additional parameters are contemplated as potential inputs to CSCM 12, so as to control the timing, and if equipped as in FIG. 8 or FIG. 12 the recirculation, of ventilated fresh exterior air into building 19. In this regard, a preferred embodiment additional parameter is a personalized climate-preference number that is given to each occupant, where different portions of the number correspond to the respective occupant's choices about the other parameters. For example, a first person PR1 may tolerate greater temperature air than a second person PR2, while the second person PR2 tolerates pollens and the first person PR1 does not. Assuming tolerance is measured on a scale of 1 to 10, with low tolerance being 1 and high tolerance being 10, then these two persons could each have a respective number assigned to them as shown in the following Table 2:

TABLE 2

| Number | Parameter | PR1 | PR2 |
|---|---|---|---|
| $P_1$ | temperature | 10 | 01 |
| $P_2$ | humidity | 05 | 05 |
| $P_3$ | Pollen | 01 | 10 |
| $P_4$ | Ozone | 05 | 05 |
| $P_5$ | time of day | 05 | 05 |
| $P_6$ | Smoke | 05 | 05 |
| $P_7$ | Radon | 05 | 05 |
| $P_8$ | occupancy | 05 | 05 |
| $P_9$ | particulate count (Ex. PM 2.5, and/or PM 5.0) | 05 | 05 |
| $P_{10}$ | Carbon Dioxide | 05 | 05 |
| $P_{11}$ | Carbon Monoxide | 05 | 05 |
| $P_{12}$ | Formaldehyde | 05 | 05 |
| $P_{13}$ | VOC | 05 | 05 |
| $P_{14}$ | $NO_2$ | 05 | 05 |
| $P_{15}$ | Acrolein | 05 | 05 |

Thus, controller 10 may solicit a person's tolerances for some or all of its parameters, and then assign a combined number to the person—for example, by simply concatenating the numbers in Table 2, person PR1 would have a personal number of 100501050505050505050505050505, while person PR2 would have a personal number of 010510050505050505050505050505, and note that these series of numbers could be encoded into a smaller form by one of various coding techniques that may be selected by one skilled in the art, the number may be represented in other forms, including other characters or manners that might import greater ease for a person to memorize their number. Thereafter, when a person arrives to building 19 or another building equipped with the preferred embodiment, that person inputs his/her personalized number, and ventilation (and/or dehumidification), where the input could be from a human memorized form or from some electronic storage or communication device that stores and is operable to communicate the user's, such as in a cell phone or portable device app or a biometric device, including a radio frequency identification tag. In any event, once the number is provided to controller 10, controller 10 monitors parameters and adjusts fan speed/CFM according to the person's personalized climate-preference number. If more than one person is at a building and their personalized numbers represent conflicting goals, then the preferred embodiment will further combine considerations given the factors, for example, deferring to parameters of greater health concern (e.g., allergies) over parameters relating solely to comfort. The above preferred embodiment aspect is shown with respect to 15 parameters, but of course may be reduced or expanded based on other parameters.

Given the preceding, while currently mechanical fresh air is often considered a burden and a cost addition for builders and developers, personalization per the preferred embodiment may be perceived as a unique, individual comforting value, while also offering improved health and welfare of the occupants. The ability to "dial in" a ventilation selection delivers a complete clear numerical scale creating a "clear" selection menu simplifying the choices available for occupants and delivering a reasonable number for each space. This allows the occupant to move from space to space and to take their desired personalized number with them. They do not have to remember what pollens or what other significant allergens they have; they only need to remember their personalized number. When friends or frequent relatives come to visit, if they have particular sensitivities, the occupants can program controller 10 to accommodate the visitors' personalized numbers(s), perhaps improving the quality of stay for friends and relatives and thus deliver additional value for the overall system.

Another significant value derived from the preferred embodiment responsiveness to unique, personalized numbers or signals associated with respective occupants, used by marketers is that it provides the categories and the system to clearly identify and assign the many potential sensor choices for programmers. Initially, many sensors may be hard-wired or otherwise fixed at the site of building 19. As access to the Internet by controller 10 and like controllers increases, Internet based data (e.g., weather, air quality) will vastly increase the potential number of parameters to a large size. One way to manage that large number for both programmers and for occupants is to utilize a standardized personalized number approach, so that it is easy to determine the ventilation selections for occupants. If industry can standardize around such a preferred embodiment numbering system, then there will be compatibility between the future outcome of differing system and consumer confusion can be significantly reduced.

Figure 13:
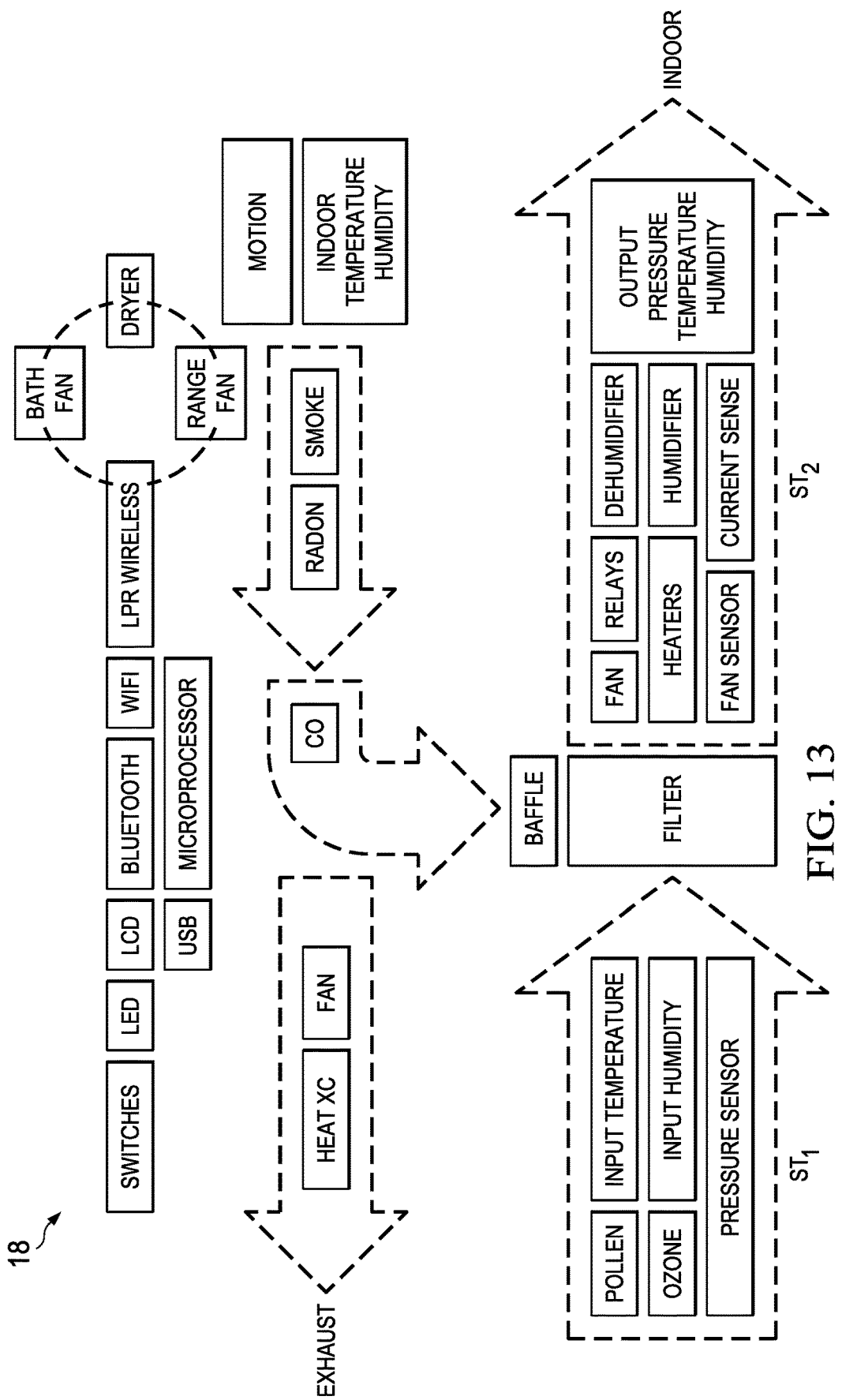
FIG. 13 illustrates an electrical, functional and system-wide block diagram of duct 18, including controller 10.

FIG. 13 illustrates an electrical, functional and system-wide block diagram of duct 18, including controller 10 (not separately identified in FIG. 13), in view of the various details provided above and with further aspects as are now described or will be appreciated by one skilled in the art. This block diagram represents an extensive mechanical ventilation system with the sensors, control elements, and internal and external devices to deliver the embodiments as described. In general, the blocks shown in FIG. 13 are functionally illustrated, and some are included in large dashed arrows so as to illustrate the directionality of air flow and the functions of certain blocks in connection with such flow. Thus, along the bottom of FIG. 13 ventilated air is shown generally to flow from exterior to interior (left to right), whereas above this directionality exhausted air may flow from indoor to exterior, and also to recirculate from that path back, via a baffle (mechanical and/or gravity dampers) and optional filter into the ventilation path.

Looking in more detail at FIG. 13, a power supply (not separately shown) is included to either provide or regulate power received from an external source, so as to deliver appropriate power levels to the various blocks of unit 18. A first fan (and associated motor, preferably DC operated, not separately shown) is provided to ventilate air from the exterior to the building interior, in connection with various sensors corresponding to parameters introduced earlier in connection with Table 1, and some of those sensors are shown in FIG. 13. Moreover, optionally a second fan may be provided to exhaust air from interior to exterior, and also to provide a recirculation path—additionally, note further that inasmuch as FIG. 13 shows a recirculation path, one or more of such sensors can be associated with air before it is recirculated (either in addition to or in lieu of sensing the respective parameter also for exterior air), as shown in FIG. 13 with the radon and smoke sensors. Associated with this fan or fans are relays for enabling/disabling and speed control of the fan. A heater may be provided in the ventilation path as well as one or both of a humidifier or dehumidifier. Thus, in addition to ventilating air, such air also may be further conditioned as it passes through duct 18. Lastly, temperature exchange may occur between the ventilation and exhaust paths, as shown by way of example via a heat exchanger ("HEAT XC") in the exhaust path.

The work of duct 18 is controlled by an illustrated microprocessor, which includes either its own memory storage or has access to an external memory (not separately shown), for purposes of accessing programming so as to perform the various preferred embodiment methodologies described in this document. Such memory is also for storing other data, such as data logged in association with numerous of the blocks in FIG. 13. For example, sensor data may be collected, as may be logging speeds and captured CFM on a periodic or near ongoing basis. Incorporated with the microprocessor are various input/output devices, including the switches, LEDs, an LCD display, Bluetooth/Wi-Fi and/or any other form of wireless or wired connection device, and a USB (or other external communication interface) port. Thus, some or all of the memory data, as well as other signaling, may be communicated by controller 10 directly or externally, the latter via various wired (e.g., USB) or wireless (Bluetooth, WiFi, cellular, or lower power (LPR) wireless) interfaces, to devices compatible with such manners of communication, such as another controller, a computer, an app on a portable device (e.g., cell phone, tablet, laptop, etc.). Further, such interfaces also may communicate with other protocol-compatible devices that perform related air communication functionality, including devices equipped to communicate with the IoT or other devices that communicate air and that are equipped to communicate wirelessly, where such devices, if modified appropriately beyond air communication functionality, can include a bath fan, range fan, dryer (or still others, such as kitchen exhaust); these latter devices, therefore, may communicate additional information to the microprocessor of unit 18 so as to further inform the total air movement at building 19 and to thereby further effect changes in the CFM to be achieved, as well as its timing, by duct 18.

In greater detail with respect to an example air flow, the air is visualized as coming from outside past a first set $ST_1$ of sensors that can capture information about the condition of the outside air as it proceeds through duct 18 where it again passes through a second set $ST_2$ of sensors to be measured as acceptable prior to entering the indoor environment and if unacceptable to send a signal back to the microprocessor to turn off the fan and move into sensing mode. Note that the second set $ST_2$ of sensors includes either or both of a fan sensor or current sense, either of which are included to indicate circuitry for determining fan speed, which as described earlier may be inferred from the drive signal if the fan motor is a DC motor. FIG. 13 also indicates a balanced system showing the indoor air going through a cycle and being exhausted by duct 18. Prior to heading back through duct 18, the indoor air is exposed to additional sensors (smoke and radon) that evaluate the condition of the indoor air. Each such sensor sends a signal to the microprocessor that generates action or no action depending on the signal. Depending on the outside air conditions, and the relative inside and outside air conditions, the indoor air can be recirculated back inside the building and through a baffle and then a high particulate removal filter for indoor air cleaning credit, for multiple passes of the air through the dehumidifier for a way to avoid bringing in really extreme outdoor air while still doing work of value to indoor air quality. In one embodiment, duct 18 may have a form of heat exchanger to recapture heat and return it to the inside during really code outdoor temperatures.

Figure 14:
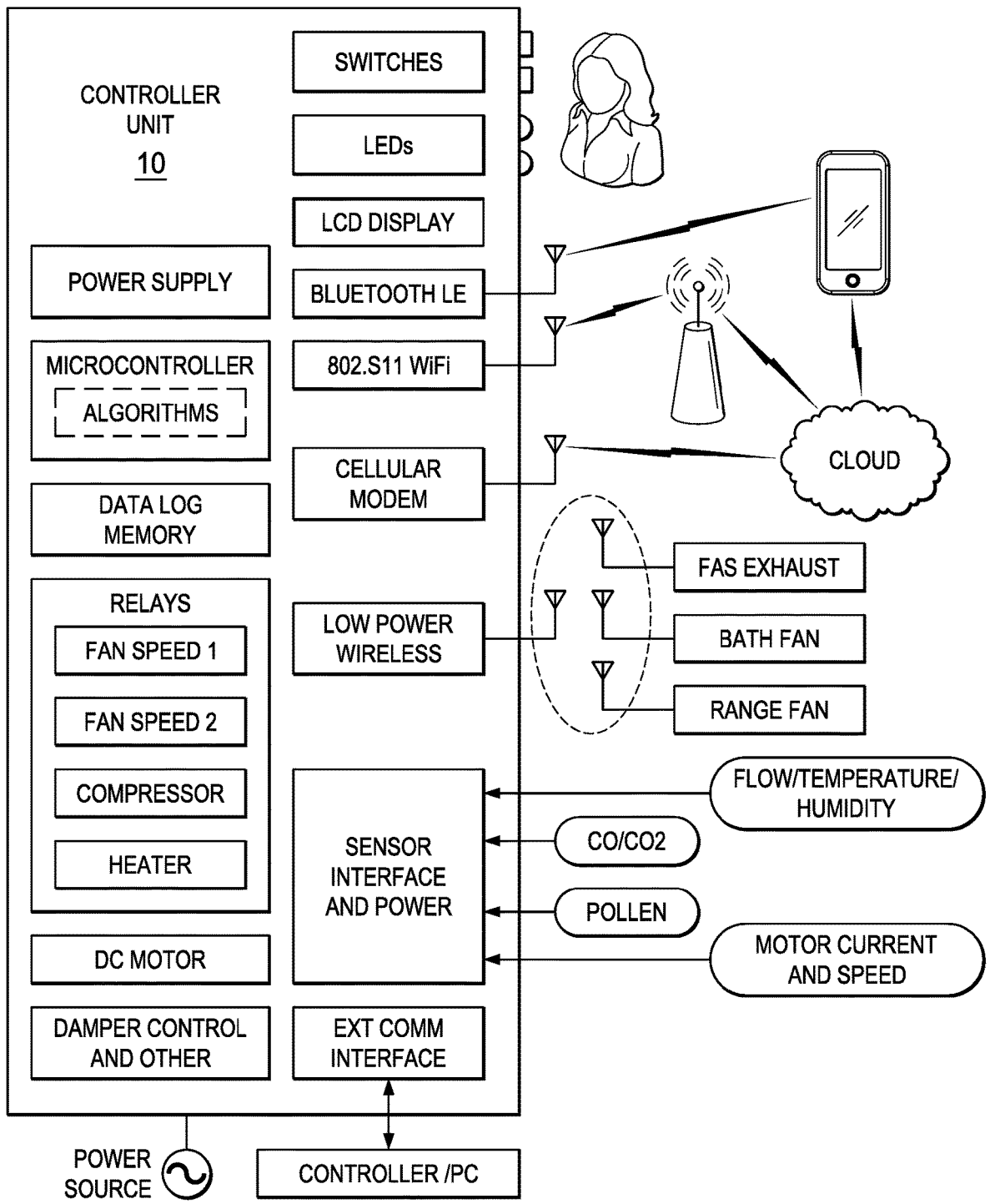
FIG. 14 illustrates an electrical and functional block diagram of controller 10 apart from duct 18.

FIG. 14 illustrates an electrical and functional block diagram of controller 10 apart from duct 18, with various of the blocks introduced earlier in this document. Thus, where items have been discussed earlier, the reader is assumed familiar with such discussion. FIG. 14, therefore, illustrates how various items may be incorporated with controller 10 itself, and may communicate via various antennae to various external devices, whether to portable devices, WiFi devices, a cell tower, the cloud, low power wifeless devices (e.g., exhaust, bath fan, range fan), or via interfaces such as a preferably unidirectional sensor interface or external bidirectional communication interface.

Given the preceding, the preferred embodiments provide an improved residential, multifamily, and small commercial building controlled, multi-parameter, multiple-speed and CFM capturing mechanical ventilation. The preferred embodiments address numerous drawbacks and concerns of the current art. For example, as building construction is tightened with lesser natural air flow, the preferred embodiments endeavor to maintain that some ventilated exterior fresh air is better than either no fresh air and near compliance with a standard is a far better solution that inviting or incentivizing users from disabling their ventilation system; indeed, such near compliance also is recordable and reportable by the preferred embodiment so as to potentially adjust future standards as to more readily adopt human behavior given myriad parameters and personalized choices. Over time, the preferred embodiment will improve products, and eventually, with the aid of research that comes from actual use and recording of how occupants use and value fresh air, there will be a convergence between the products and the compliance to the standards. The preferred embodiments offer acceptable and smart energy and interior air quality tradeoff. The preferred embodiments expand the 24 hours that is required by the ASHRAE standard and measures the CFM of the delivered air from the ventilation system for an extended period even up to an entire year or beyond. The preferred embodiments also report periods of time that work best in terms of the actual tradeoffs between competing objectives, recognizing that such periods of time and the tradeoffs will vary by climate zone and by weather data, and actual usage data will vary by the selections of the particular occupants. Moreover, the described hot wire methodology may be a preferred embodiment optimum choice based on relatively low price, which can be considerably less than pressure transducers. The hot wire methodology offers an opportunity to introduce an integrated and multifunction control, where the unit itself can deliver and report out a "certified performance air flow level" calculation that is within acceptable tolerance with greater speed and better (or at least acceptable) performance tolerance. In addition to air flow speed (in cubic feet per minute), the system can determine and record fan failure mode, filter clog mode as well as real delivered CFM. Still further, in a preferred embodiment, performance information is, either in addition to or in lieu of being real time displayed at controller 10, is stored either by controller 10 or communicated elsewhere where it is stored, in either case for future evaluation, thereby facilitating a reporting of long term usage and actual CFM (effectiveness) creating value for consumers, marketers and for research on the impacts and value of the standard. Data collected permits additional preferred embodiment to capture the measures of performance on the time shift, the humidity shift, the comfort, on these greater time periods on a rolling basis. The preferred embodiment performance also may be measured and compared is to the Code levels and the ASHRAE 62 levels of performance during each one of these time periods and measure it for any and all time periods over a one year/365-day time period. Adjustments to ventilation are also contemplated based on the actual number of occupants and time occupancy in the building. One key preferred embodiment aspect is a fan speed/CFM generation that performs at an above-standard rate and a controller of the fan speed (or accomplished CFM) to adjust from standard speed to maximum speed/CFM (and to minimum speed/CFM when sampling or even below when fully off) and the transparent reporting to the occupants. The preferred embodiment controller can report how an interior space is performing in terms of ventilation and to what standard it is performing. With such information, an occupant has the ability to determine and make reasonable personal choices about what they actually want and can know the potential impacts of that decision. And, with mechanical ventilation delivery systems that are basically transparent to the occupant (quiet, independent fans, delivering tempered air that is well distributed), the occupant can have very little negative impacts from getting actual or near compliance to the air quality that research increasingly demonstrates they need. By creating simple consumer selection methods; air quality selection numbers, the occupants can easily pick the air that best suits their needs. The preferred embodiments, therefore, create the best set of choices for all stakeholders and help make fresh air a viable offering for all stakeholders in the chain.

The preferred embodiments also provide a considerable improvement over the mandated and likely-to-be-overused "off" mode required by ASHRAE Standard of ventilation products. For example, rather than rigidly adhering to a fixed 24-hour schedule and inviting a likely turn off scenario, the preferred embodiments accommodate real world considerations and practical compromise in ventilation products providing an improved real world impact on performance of acceptable indoor air quality. With the goals of high performance building indoor air quality and minimized ventilation use, the preferred embodiments endeavor to: (i) dry out the building; (ii) periodically over-ventilate the dry air; (iii) optimize tradeoff between energy performance and indoor air quality; (iv) control pollutants to reduce the air flow need for dilutions; (v) expand ventilation to include more capability; (vi) control ozone and particulates (large and small) into the building; and (vii) factor considerations of occupancy in controlling ventilation amount and balance.

Still further, the preferred embodiments may considerably advance the savings, and hence the acceptability to both consumers and industry, in improving fresh air ventilation while reducing load costs previously attributed to ventilation, particularly in connection with energy savings associated with shifting ventilation time/amount based on time factors, humidity, and possible other factors that may load an HVAC system. Particularly, one of the very significant problems outlined earlier is the associated energy penalty of mechanical ventilation. Initial research, funded by the U.S. Department of Energy (U.S. DOE), investigating the concept of smart ventilation limited to "time shift" as introduced by I. S. Walker, M. H. Sherman and D. J. Dickerhoff, estimated typical ventilation energy savings of 40% or about 15% of total heating and cooling load. Given the preceding embodiments, however, including but not limited to the humidity shift and change of fan speed/CFM, it is estimated that the associated energy savings of various preferred embodiments may be 50% or greater. By comparing the heating and cooling load associated with continuous mechanical ventilation and actual or estimated run times inclusive of when peak time periods are avoided through the CSMC control, energy savings could be calculated on a daily, weekly or annual (or anything in between) basis. The energy use reduction could be communicated as, but not limited to, kWh, MMBtu, $CO_2$ emission reduction, a zEPI score, or an Energy Rating Index such as the HERS Index, and such communications can be used to inform both user and remote facilities of the efficacy and worthiness of the preferred embodiments as well as facilitating an overall improvement from better and more widespread use of fresh air ventilation.

From the preceding, therefore, the inventive scope is demonstrated by the teachings herein and is further guided by the following exemplary but non-exhaustive claims.

What is claimed is:

1. A ventilation system, comprising:
   a volumetric enclosure having an inlet and an outlet and for coupling to an interior of a building habitable by human occupants;
   a variable speed fan located within the volumetric enclosure for drawing in air exterior to the building and supplying the air to the interior of the building;
   a user programmable controller for controlling the variable speed fan in response to a plurality of sensors, at least some of the sensors relating to quality of air to be moved in response to the fan; and
   a display configured by an input/output interface for displaying data representing a volume of air passing through the volumetric enclosure over a period of time; wherein
   the user programmable controller is programmed to control the variable speed fan during first and second periods of time corresponding to respective first and second air flow levels; and
   the plurality of sensors including at least a temperature sensor, a relative humidity sensor, and an air flow sensor for measuring and communicating signals of respective temperature, humidity, and air flow levels to the user programmable controller to provide control of the variable sped fan.

2. The system of claim 1 wherein the circuitry for measuring a signal comprises a hot wire anemometer.

3. The system of claim 2, wherein the inlet comprises an inlet duct and the hot wire anemometer is positioned in the inlet duct.

4. The system of claim 3 wherein the hot wire anemometer comprises a heated thermistor positioned at an axis of the inlet duct.

5. The system of claim 3 wherein the hot wire anemometer comprises a reference sensing thermistor positioned away from the axis of the inlet duct.

6. The system of claim 5 wherein the hot wire anemometer comprises the reference sensing thermistor positioned downstream in air direction from the heated thermistor.

7. The system of claim 1 wherein the user programmable controller is programmed to:
   control the variable speed fan during a first period of time to supply air to the interior of the building to satisfy a first air flow level equal to or exceeding a building standard; and
   control the variable speed fan during a second period of time to supply air to the interior of the building to satisfy a second air flow level equal to or exceeding a building standard, wherein the second air flow level exceeds the first air flow level.

8. The system of claim 1 and further comprising circuitry for storing data representative of the volume of air passing through the volumetric enclosure over the period of time.

9. The system of claim 8 wherein the data representative of the volume of air passing through the volumetric enclosure over the period of time is expressed in CFM.

10. The system of claim 1 and further comprising circuitry for communicating, external from the system, data representative of the volume of air passing through the volumetric enclosure over the period of time.

11. The system of claim 1 wherein the plurality of parameters includes at least one of pollen, ozone, smoke, radon, carbon dioxide, carbon monoxide, formaldehyde, VOC, N02, acrolein, particulates, building nominal occupancy, and building current occupancy.

12. The system of claim 1 wherein the plurality of parameters includes at least time of day.

13. The system of claim 1 wherein the variable speed fan comprises a first fan, and further comprising a second fan for drawing air from the interior of the building to exhaust to the exterior of the building.

14. The system of claim 13 wherein the volumetric enclosure further comprises recirculating apparatus for recirculating from the interior of the building back into the interior of the building.

15. The system of claim 14 wherein the recirculating apparatus comprises a damper under control of the programmable control apparatus and for closing in response to one more of the plurality of parameters.

16. The system of claim 14 wherein the recirculating apparatus comprises a dehumidifier.

17. The system of claim 14 wherein the recirculating apparatus comprises an air cleaning device.

18. The system of claim 1 wherein the programmable control apparatus further comprises circuitry for indicating that the volume of air passing through the volumetric enclosure over a period of time is below an acceptable threshold.

19. The system of claim 1 wherein the programmable control apparatus further comprises circuitry for indicating a failure in response to speed of the fan and the volume of air passing through the volumetric enclosure over a period of time falling below an acceptable threshold.

20. The system of claim 1 wherein the plurality of parameters comprise a user-assigned code indicating parameters associated with a user preference.

21. The system of claim 1 wherein the programmable control apparatus is affixed to the volumetric enclosure.

22. The system of claim 1 wherein a first portion of the programmable control apparatus is affixed to the volumetric enclosure; and wherein a second portion of the programmable control apparatus is remote from the volumetric enclosure.

23. The system of claim 22 wherein at least part of the second portion is located in a thermostat.

24. The system of claim 22 wherein at least part of the second portion is located in Internet of Things devices located at the building.

25. The system of claim 1 wherein at least one sensor in the plurality of sensors is affixed to the volumetric enclosure.

26. The system of claim 1 wherein at least one sensor in the plurality of sensors is remote from the volumetric enclosure.

27. The system of claim 1 and further comprising circuitry for detecting a speed of the fan.

28. The system of claim 27 and further comprising circuitry for identifying a potential fan failure in response to the circuitry for detecting a speed of the fan and the circuitry for measuring a signal representative of a volume of air passing through the volumetric enclosure over a period of time.

29. The system of claim 27 and further comprising circuitry for identifying a potential air flow restriction in response to the circuitry for detecting a speed of the fan and the circuitry for measuring a signal representative of a volume of air passing through the volumetric enclosure over a period of time.

30. The system of claim 13, wherein the second fan provides heat recovery ventilation to balance intake and exhaust air volume with respect to air temperature.

31. The system of claim 13, wherein the second fan provides energy recovery ventilation to balance intake and exhaust air volume with respect to air temperature and humidity.

32. An integrated fan and sensor combination for use in a system to provide comfort ventilation of a building, comprising:
a variable speed fan assembly mounted within a housing configured to duct outside air along an air flow path through the housing into an inside space of the building in response to fan control signals;
an air flow sensor module comprising a substrate having a heated thermistor disposed along the axis of the air flow path and a reference thermistor disposed in the air flow path in a spaced-away relationship with the heated thermistor;
first and second respective sensors for air temperature and relative humidity, disposed in the air flow path within the housing; and
a user-programmable controller, including a control panel and a display, the controller coupled to the variable speed fan, the sensor module, and the respective sensors for air temperature and relative humidity, for generating the fan control signals to control the variable speed fan responsive to:
user-defined minimum and maximum limits, entered via the control panel, for the air temperature and relative humidity of the outside air admitted to the housing via the fan and conducted into the inside space; and
user-defined minimum and maximum limits, entered via the control panel, for the volume of air flow (CFM) supplied by the variable speed fan and conducted into the inside space; wherein
the air temperature, relative humidity, and volume of the air flow into the inside space are maintained within the user-defined minimum and maximum limits to provide the comfort ventilation; and
the volume of air flow (CFM) is displayed to the user on the display to confirm it is within the minimum and maximum user-defined limits for the desired comfort ventilation.

33. The combination of claim 30, wherein:
the variable speed fan assembly includes a motor responsive to the fan control signals.

34. The combination of claim 30, wherein:
the air flow sensor module comprises a hot-wire anemometer.

35. The combination of claim 30, wherein:
the user-programmable controller varies the speed of the variable speed fan to maintain the volume of air flow (CFM).

36. The combination of claim 30, wherein:
the user-programmable controller comprises a programmable device selected from the group comprising a microprocessor, a microcontroller, a digital signal processor, and an application-specific integrated circuit.

* * * * *